United States Patent
Mekis et al.

(10) Patent No.: US 10,686,526 B2
(45) Date of Patent: *Jun. 16, 2020

(54) METHOD AND SYSTEM FOR SILICON PHOTONICS WAVELENGTH DIVISION MULTIPLEXING TRANSCEIVERS

(71) Applicant: Luxtera LLC., Wilmington, DE (US)

(72) Inventors: Attila Mekis, Carlsbad, CA (US); Peter De Dobbelaere, San Diego, CA (US); Lieven Verslegers, La Jolla, CA (US); Peng Sun, San Diego, CA (US); Yannick De Koninck, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,582

(22) Filed: Mar. 14, 2019

(65) Prior Publication Data

US 2019/0215075 A1 Jul. 11, 2019

Related U.S. Application Data

(63) Continuation of application No. 15/907,613, filed on Feb. 28, 2018, now Pat. No. 10,236,985, which is a continuation of application No. 14/925,452, filed on Oct. 28, 2015, now Pat. No. 9,912,408.

(60) Provisional application No. 62/122,718, filed on Oct. 28, 2014.

(51) Int. Cl.
*H04B 10/40* (2013.01)
*H04B 10/50* (2013.01)
*H04J 14/02* (2006.01)

(52) U.S. Cl.
CPC .......... *H04B 10/40* (2013.01); *H04B 10/506* (2013.01); *H04B 10/5053* (2013.01); *H04J 14/02* (2013.01)

(58) Field of Classification Search
None
See application file for complete search history.

(56) References Cited

U.S. PATENT DOCUMENTS

| | | |
|---|---|---|
| 6,423,980 B1 | 7/2002 | Wilson |
| 7,194,166 B1 | 3/2007 | Gunn, III |
| 9,912,408 B2 * | 3/2018 | Mekis ................ H04J 14/02 |
| 2011/0228939 A1 | 9/2011 | Jackel |

(Continued)

*Primary Examiner* — Casey L Kretzer
(74) *Attorney, Agent, or Firm* — McAndrews, Held & Malloy

(57) ABSTRACT

Methods and systems for silicon photonics wavelength division multiplexing transceivers are disclosed and may include, in a transceiver integrated in a silicon photonics chip: generating a first modulated output optical signal at a first wavelength utilizing a first electrical signal, generating a second modulated output optical signal at a second wavelength utilizing a second electrical signal, communicating the first and second modulated output optical signals into an optical fiber coupled to the chip utilizing a multiplexing grating coupler in the chip. A received input optical signal may be split into a modulated input optical signal at the first wavelength and a modulated input optical signal at the second wavelength utilizing a demultiplexing grating coupler in the chip. The first and second modulated input optical signals may be converted to first and second electrical input signals utilizing first and second photodetectors in the chip.

16 Claims, 20 Drawing Sheets

(56) References Cited

U.S. PATENT DOCUMENTS

2013/0208334 A1    8/2013   Kakande
2014/0153931 A1    6/2014   Doerr
2016/0202423 A1    7/2016   Li

* cited by examiner

METHOD AND SYSTEM FOR SILICON PHOTONICS WAVELENGTH DIVISION MULTIPLEXING TRANSCEIVERS

CROSS-REFERENCE TO RELATED APPLICATIONS/INCORPORATION BY REFERENCE

This application is a continuation of U.S. application Ser. No. 15/907,613 filed on Feb. 28, 2018, which is a continuation of U.S. application Ser. No. 14/925,452 filed on Oct. 28, 2015, now U.S. Pat. No. 9,912,408, which claims priority to and the benefit of U.S. Provisional Application 62/122,718 filed on Oct. 28, 2014, which is hereby incorporated herein by reference in its entirety.

FIELD

Certain embodiments of the disclosure relate to semiconductor photonics. More specifically, certain embodiments of the disclosure relate to a method and system for silicon photonics wavelength division multiplexing transceivers.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for silicon photonics wavelength division multiplexing transceivers, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Figure 1A:
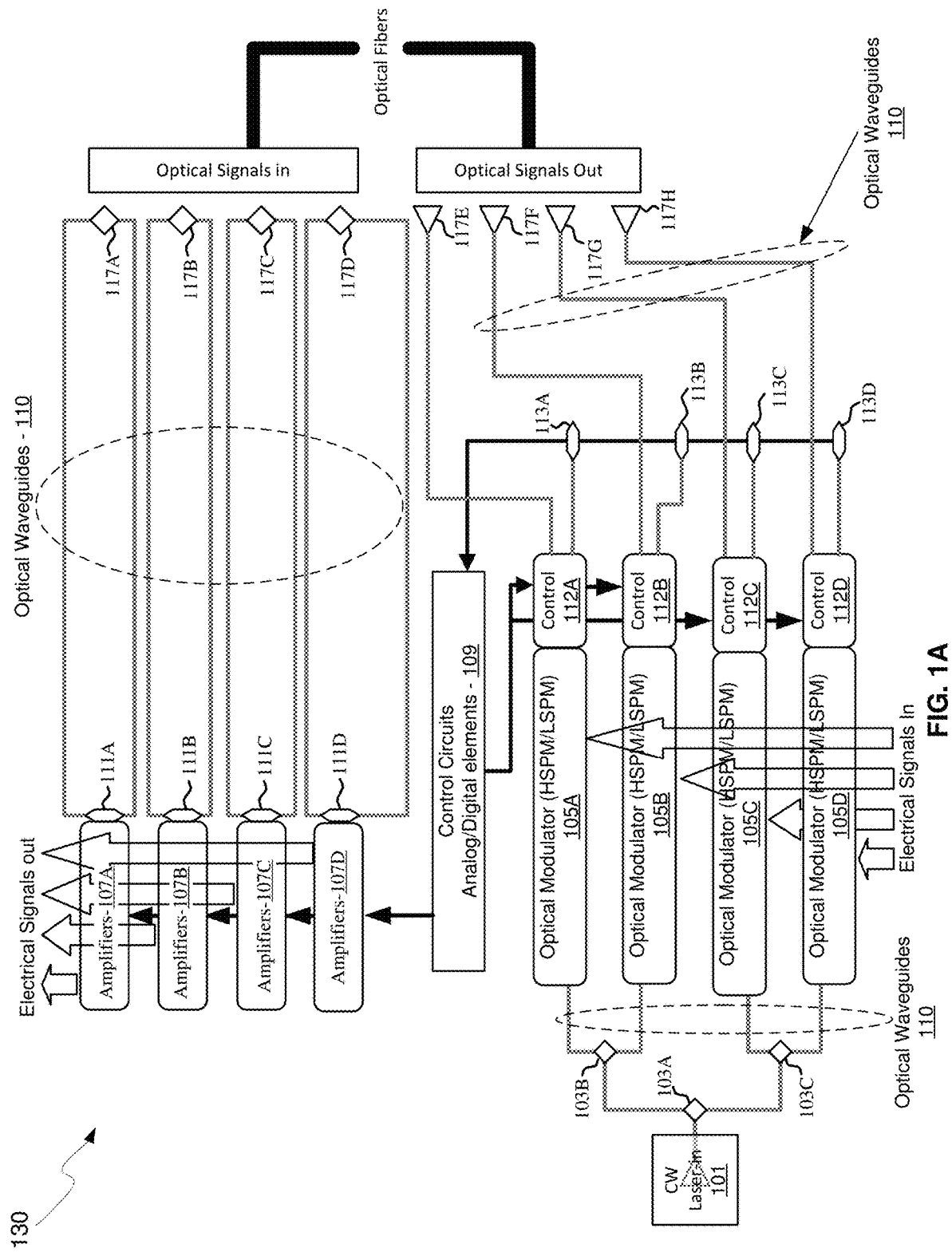
FIG. 1A is a block diagram of a photonically-enabled integrated circuit with silicon photonics wavelength division multiplexing transceivers, in accordance with an example embodiment of the disclosure.

Certain aspects of the disclosure may be found in a method and system for silicon photonics wavelength division multiplexing transceivers. Exemplary aspects of the disclosure may comprise, in a transceiver integrated in a silicon photonics chip: generating a first modulated output optical signal at a first wavelength utilizing a first electrical signal, generating a second modulated output optical signal at a second wavelength utilizing a second electrical signal, and communicating the first and second modulated output optical signals into an optical fiber coupled to the chip utilizing a multiplexing grating coupler in the chip. A received input optical signal may be split into a modulated input optical signal at the first wavelength and a modulated input optical signal at the second wavelength utilizing a demultiplexing grating coupler in the chip. The modulated input optical signal at the first wavelength may be converted to a first electrical input signal utilizing a first photodetector in the chip. The modulated input optical signal at the second wavelength may be converted to a second electrical input signal utilizing a second photodetector in the chip. The first and second modulated output optical signals may be generated by modulating continuous wave (CW) optical signals at the first and second wavelengths, respectively. The multiplexing grating coupler and/or the demultiplexing grating coupler may comprise a grating region and an expanding region between the grating region and an optical waveguide, with a slit between the grating region and the tapered region. The multiplexing grating coupler may comprise a pair of intersecting gratings. A spacing of each intersecting grating may be configured to scatter optical signals at one of the first and second wavelengths. Scatterers may be situated at intersections of the intersecting gratings. The scatterers may comprise holes in a silicon layer at or near a top surface of the silicon photonics chip. The multiplexing grating coupler and/or the demultiplexing grating coupler may comprise a grating with hexagonal symmetry. The demultiplexing grating coupler may comprise a grating that scatters optical signals at the first wavelength into at least one waveguide in the silicon photonics chip in a first direction and scatters optical signals at the second wavelength into at least one waveguide in the silicon photonics chip in a second direction substantially opposite to the first direction. The multiplexing grating coupler and/or the demultiplexing grating coupler may comprise a beam-splitting grating coupler.

The multiplexing grating coupler may comprise a pair of intersecting gratings, where a spacing of each intersecting grating is configured to scatter optical signals at one of the first and second wavelengths. Scatterers may be situated at intersections of the intersecting gratings, and may comprise holes etched in a surface of the silicon photonics chip. The multiplexing grating coupler and/or the demultiplexing grating coupler may comprise a grating with hexagonal symmetry. The demultiplexing grating coupler may comprise a grating that scatters optical signals at the first wavelength into a waveguide in the silicon photonics chip in a first direction and scatters optical signals at the second wavelength into a waveguide in the silicon photonics chip in a second direction opposite to the first direction. The demultiplexing grating coupler may comprise a beam-splitting single polarization grating coupler.

FIG. 1A is a block diagram of a photonically-enabled integrated circuit with silicon photonics wavelength division multiplexing transceivers, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more continuous-wave (CW) optical signals to the coupler 103A. A CW optical signal may comprise an unmodulated optical signal comprising a coherent frequency component at a wavelength $\lambda_1$, for example. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrate 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
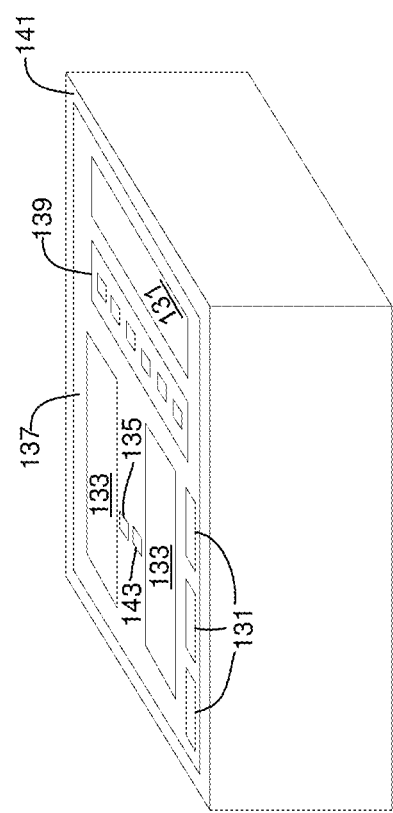
FIG. 1B is a diagram illustrating an exemplary photonically-enabled integrated circuit, in accordance with an example embodiment of the disclosure.
Figure 1B:
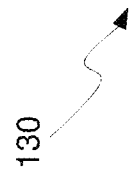

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

One of the most important commercial applications of silicon photonics is to make high speed optical transceivers, i.e., ICs that have optoelectronic transmission (Tx) and receiving (Rx) functionality integrated in the same chip. The input to such an IC is either a high speed electrical datastream that is encoded onto the Tx outputs of the chip by modulating the light from a laser, or an optical data-stream that is received by integrated photodetectors and converted into a suitable electrical signal by going through a Transimpedance Amplifier (TIA)/Limiting Amplifier (LA) chain. Such silicon photonics transceiver links operate at baudrates ranging from 10 Gbps-28 Gbps or more.

A typical approach to coupling light into an integrated optics chip is using diffractive elements, called grating couplers. Conventional grating couplers offer low coupling loss as well as high alignment tolerance. However, one drawback is the limited spectral bandwidth of these structures. For this reason, they are often considered incompatible with coarse wavelength multiplexing/demultiplexing (WDM) solutions.

In addition, implementing the multiplexing and demultiplexing elements on an integrated optics platform is complex. Control of the multiplexing/demultiplexing elements is often needed in high index-contrast platforms, such as silicon on silica. One example of a multiplexing element is an interleaver that comprises an asymmetric Mach-Zehnder interferometer (MZI). Typically, an MZI interleaver requires a biasing element to align its passband with the wavelength comb of the WDM system.

Coarse WDM uses wavelengths over a wider optical bandwidth than can be accommodated with a single conventional grating coupler. Active multiplexing and demultiplexing functions implemented on integrated optics platforms are complex and costly. The grating coupler designs presented in this disclosure enable WDM transceivers in silicon photonics. These grating couplers avoid large coupling loss penalties for coupling multiple wavelengths. Furthermore, they combine two functionalities into a single device: coupling the light signal from the fiber to the chip or vice versa (coupler functionality) and combining and separating out signals carried by multiple wavelengths (multiplexer/demultiplexer functionality).

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103C, optical terminations, grating couplers 117A-117H, optical modulators 105A-105D, high-speed heterojunction photodiodes 111A-111D, and monitor photodiodes 113A-113D.

In an example scenario, the optical and optoelectronic devices 133 may comprise grating couplers for incoming/outgoing WDM signals and the electronics devices/circuits 131 may comprise demux control circuitry.

Figure 1C:
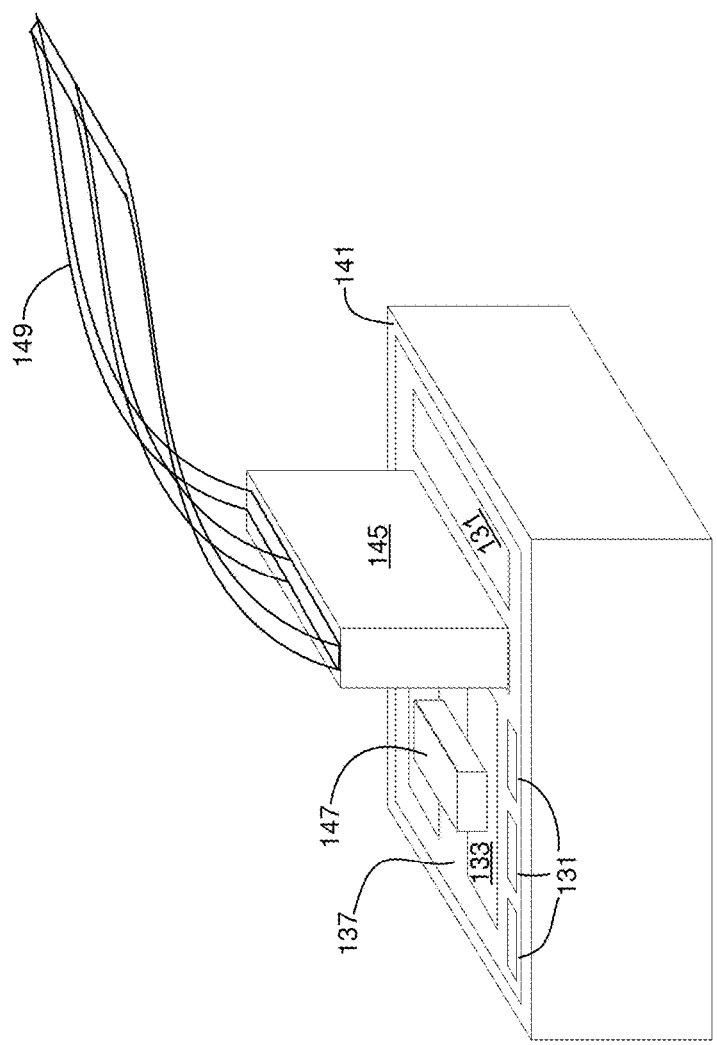
FIG. 1C is a diagram illustrating a photonically-enabled integrated circuit coupled to an optical fiber cable, in accordance with an example embodiment of the disclosure.
Figure 1C:
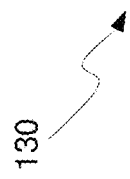

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137 and the CMOS guard ring 141. There are also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2:
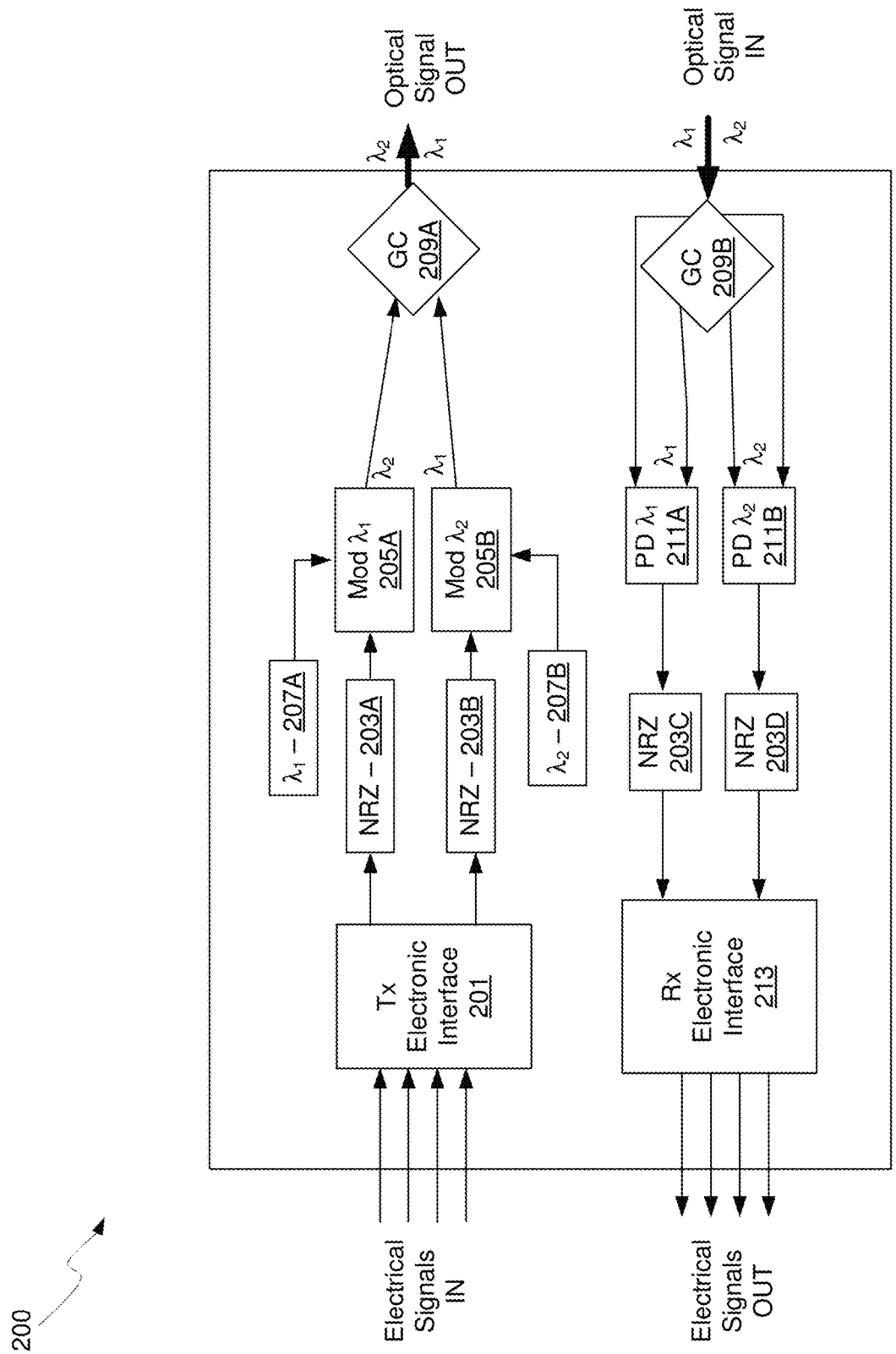
FIG. 2 is a schematic illustrating an example bi-wavelength optical transceiver, in accordance with an embodiment of the disclosure.

FIG. 2 is a schematic illustrating an example bi-wavelength optical transceiver, in accordance with an embodiment of the disclosure. Referring to FIG. 2, there is shown a multi-wavelength WDM transceiver 200 comprising electronic, optical, and optoelectronic devices for communicating electrical and optical signals. Accordingly, the transceiver 200 comprises a Tx electronic interface 201, non-return-to-zero (NRZ) modules 203A-203D, modulators 205A and 205B, lasers 207A and 207B, grating couplers 209A and 209B, photodetectors 211A and 211B, and a Rx electronic interface 213.

The Tx electronic interface 201 may comprise suitable circuitry for receiving electrical signals from other parts of the chip that comprise the transceiver 200 or from external to the chip, and multiplex them into a smaller number of signals. For example, the Tx electronic interface 201 may receive four 10 Gb/s NRZ signals and multiplex them to two 50 Gb/s NRZ signals. Alternatively, the Tx electronic interface 201 may receive four 25 Gb/s NRZ signals and multiplex them to two 25 Gbaud PAM-4 multilevel signals.

The NRZ modules 203A and 203B may comprise suitable circuitry for processing multiplexed NRZ signals and reducing signal noise, for example, before communicating the resulting signals to the modulators 205A and 205B. The laser sources 207A and 207B may comprise semiconductor lasers in an optical source assembly coupled to the chip comprising the transceiver 200, and may each be operable to emit continuous-wave (CW), or unmodulated, optical source signals to the transceiver. The laser sources 207A and 207B may couple light into the chip via grating couplers, as shown in FIGS. 1A and 1B, and the received optical source signal may be communicated via waveguides to the modulators 205A and 205B.

The modulators 205A and 205B may comprise Mach-Zehnder modulators, for example, that may receive CW optical signals from the laser sources 207A and 207B and modulate the optical signals with a data signal comprising the NRZ electrical signals from the NRZ modules 203A and 203B. The NRZ electrical signals may modulate the index of refraction and/or absorption in sections of the modulators 205A and 205B, resulting in a modulated optical signal that may be communicated via waveguides to the grating coupler 209A. In an example scenario, each modulator 205A and 205B may be configured for a different wavelength, $\lambda_1$ and $\lambda_2$, which may then be multiplexed by grating coupler 209A.

The grating coupler 209A may comprise a polarization multiplexing grating coupler (PMGC) with gratings tuned to a different wavelength at each waveguide input. This is shown further with respect to FIGS. 3-18.

Similarly, the grating coupler 209B may comprise a demultiplexing grating coupler (DMGC) that is operable to receive multiplexed optical signals at a plurality of wavelengths, two in this example, and communicate each wavelength to a different photodetector 211A or 211B. Grating couplers are described further with respect to FIGS. 3-18.

The photodetectors 211A and 211B may comprise integrated photodiodes on the transceiver die, and may each be operable to detect a different wavelength, $\lambda_1$ and $\lambda_2$, for example, and generate electrical signals representative of the data signals at each wavelength. The electrical signals may then be communicated to the NRZ modules 203C and 203D, which may comprise suitable circuitry for processing multiplexed NRZ signals and reducing signal noise, for example, before communicating the resulting signals to the Rx electronic interface 213.

The Rx electronic interface may comprise suitable circuitry for receiving electrical signals from other parts of the chip that comprise the transceiver 200 or from external to the chip, and multiplex them into a smaller number of signals. For example, the Rx electronic interface 213 may receive two 50 Gb/s NRZ signals and demultiplex them to four 25 Gb/s NRZ signals. Alternatively, the Rx electronic interface 213 may receive two 25 Gbaud PAM-4 multilevel signals and demultiplex them to four 25 Gb/s NRZ signals.

The transmitter and the receiver sides of the transceiver typically require a different type of coupling element. On the transmitter side it is usually acceptable to launch a signal into the fiber with an arbitrary polarization. However, on the receiver side, the polarization state of the incoming signal is unknown if the fiber used in the system is not polarization maintaining. Therefore, the grating coupler is also often required to couple the optical signal from the fiber so that the coupled power is substantially polarization independent. The input and output optical signals in FIG. 1 may be communicated in the same optical fiber, in separate cores in a multi-core fiber, or in different fibers in a fiber ribbon, for example.

The example optical transceiver chip shown in FIG. 2 transmits at 100 Gb/s rates by combining two 25 Gbaud PAM-4 signals onto two carrier wavelengths. A bi-wavelength polarization-multiplexing grating coupler (PMGC), grating coupler 209A, on the transmitter interface multiplexes the two wavelengths $\lambda_1$ and $\lambda_2$ into a single fiber. On the receiver input, a demultiplexing grating coupler (DMGC), grating coupler 209B, may be used to couple and demultiplex the signal into four separate waveguides. The pair of waveguides carrying signals with the same wavelength may be detected in a single photodetector (PD) 211A or 211B. The fiber input to the grating coupler 209B is shown with $\lambda_1$ and $\lambda_2$ indicating that the signals at both wavelengths are carried together in the fiber and the output at GC 209A also illustrates both wavelengths.

Figures 3A, 3B:
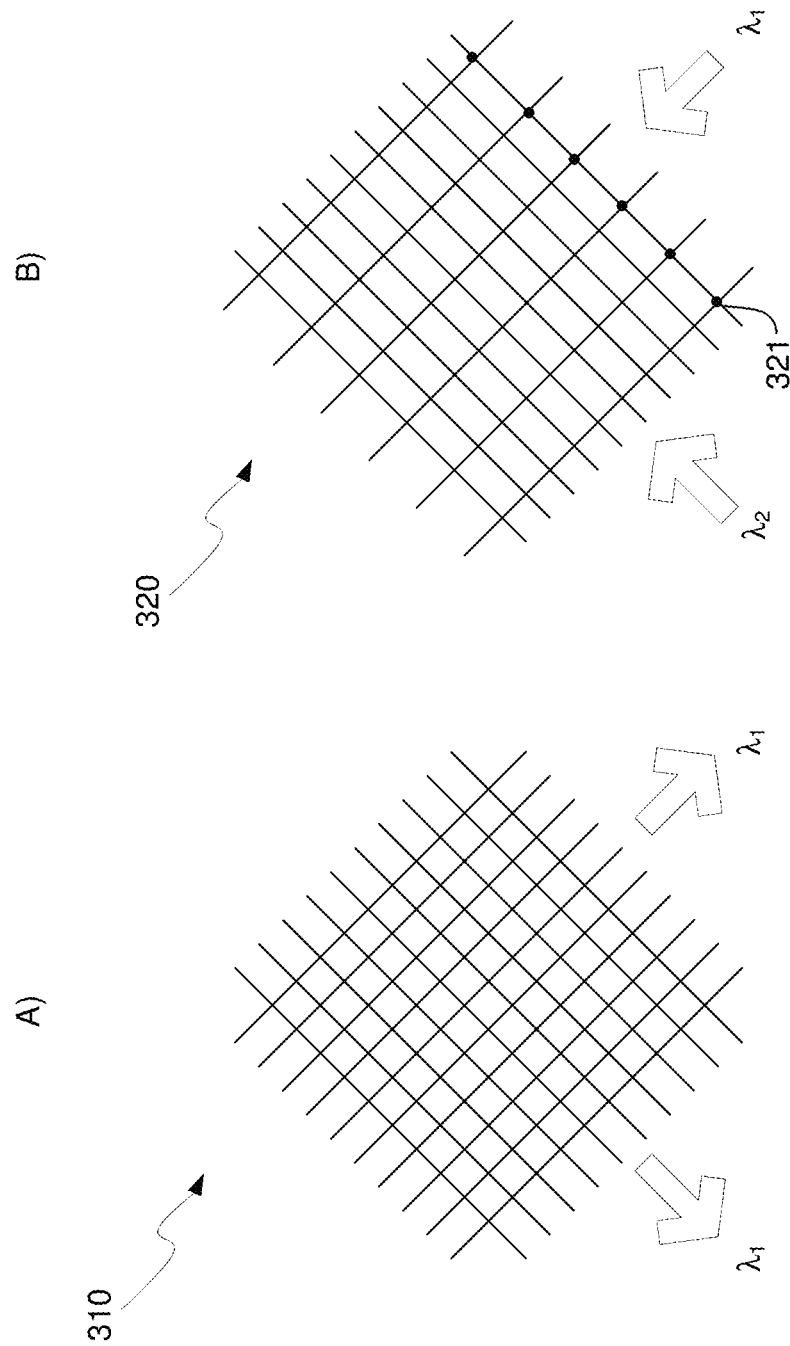
FIGS. 3A and 3B illustrate the gratings in a polarization splitting grating coupler and a polarization multiplexing grating coupler, in accordance with an example embodiment of the disclosure.

FIGS. 3A and 3B illustrate the gratings in a polarization splitting grating coupler and a polarization multiplexing grating coupler, in accordance with an example embodiment of the disclosure. Referring to FIG. 3A, there is shown an array of gratings for a polarization splitting grating coupler (PSGC) 310. As shown in FIG. 3A, the grating pitch is the same for each output direction. In this manner, both outputs communicate optical signals with the same wavelength.

An example of a grating coupler that multiplexes two signals at different wavelengths into a single fiber is a PMGC comprising a two-dimensional (2D) grating, which may be considered as two intersecting one-dimensional (1D) gratings. The PMGC is in some of its aspects analogous to a PSGC, but its layout and functionality differs substantially from that of the PSGC. In the PMGC, the scatterers that direct the optical power out of the plane of the chip are placed at the intersections of the two 1D gratings. In the PSGC, the pitch of these two gratings is identical, corresponding to the wavelength of the single optical signal, whereas in the PMGC 320, the two pitches differ and correspond to the wavelengths of the two optical signals.

The lines in FIG. 3B represent the constituent 1D gratings in the plane of the chip for the two different wavelengths, as indicated by the arrows labeled $\lambda_1$ and $\lambda_2$. The fiber is near perpendicular to the plane of the drawing and is situated above the gratings, although the fiber typically encloses a small angle of approximately between 5-20 degrees with the normal to the chip. The arrows show the direction of the light propagation in the plane of the chip, and wavelengths $\lambda_1$ and $\lambda_2$ indicate the direction in which the optical signal propagates for the two different wavelengths.

One way to utilize the PMGC in a WDM photonic circuit is to multiplex two arbitrary wavelengths together into a single fiber. The arrows in FIG. 3A indicate that the PSGC 310 is typically used as an input to a receiver, and depending on the polarization of the light in the fiber, the optical power is split into two more or less orthogonal directions on the chip. The PMGC 320 has two inputs on the chip, where two different wavelength signals are provided, indicated by the arrows labeled $\lambda_1$ and $\lambda_2$. The PMGC 320 may couple both signals to the same fiber situated above the grating. The polarization vectors of the two signals coupled into the fiber will be approximately perpendicular to each other.

The overlapping gratings can be fabricated in practice by placing scattering elements 321 at the intersections of the curves, with only one row shown for simplicity. For example, holes of various shapes can be etched into a silicon substrate at the intersections to provide a 2D grating that has the multiplexing coupler functionality. The scatterers 321 may be formed by etching layers of the chip or by depositing features, for example.

The PMGC 320 may also be used as a demultiplexer coupler, if the two wavelength signals in the fiber have orthogonal polarizations and align with the appropriate directions of the grating in the PMGC 320. This can be the case, for example, when the fiber medium is a polarization-maintaining fiber (PMF).

Figures 4A, 4B:
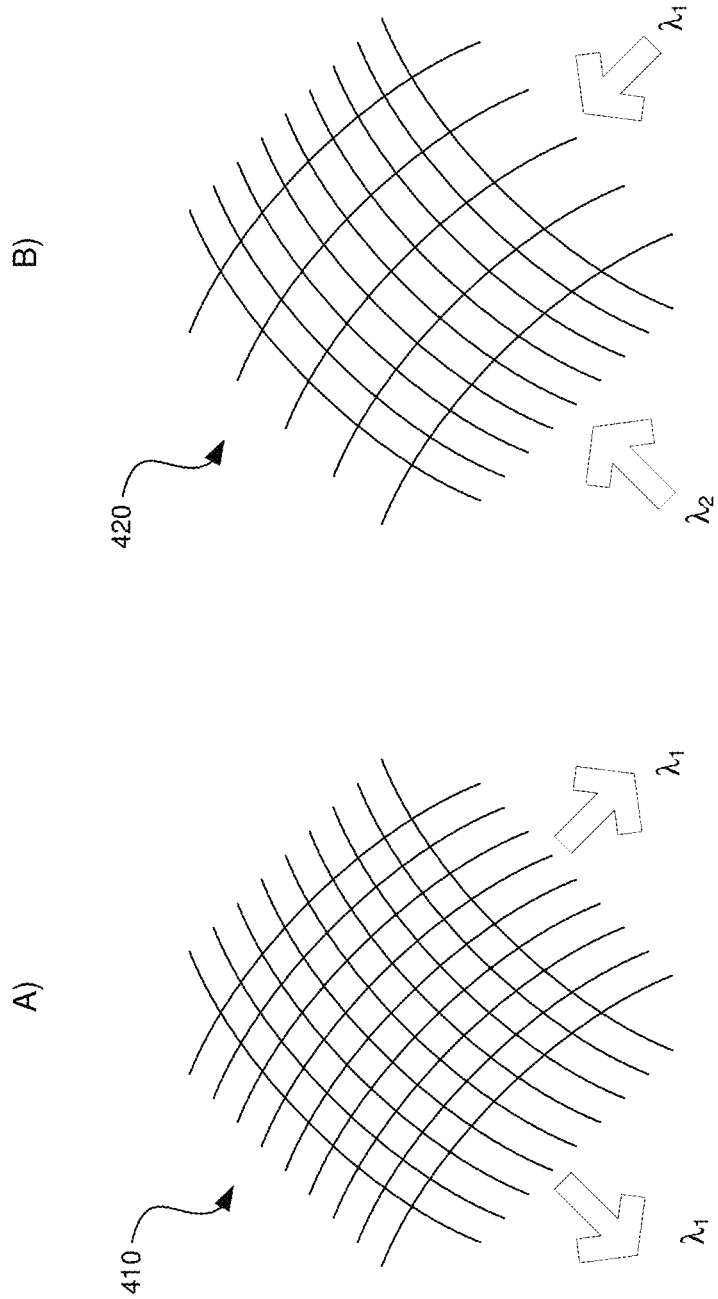
FIGS. 4A and 4B illustrated grating couplers with curved gratings, in accordance with an example embodiment of the disclosure.

FIGS. 4A and 4B illustrated grating couplers with curved gratings, in accordance with an example embodiment of the disclosure. Referring to FIG. 4A, there is shown PSGC 410 with curved gratings and FIG. 4B illustrates PMGC 420 with curved gratings. While in the example shown in FIGS. 3A and 3B straight uniform 1D gratings are drawn, it is possible to employ the same construction to build a PMGC based on curved focusing gratings, as shown in FIG. 4B The curved gratings in the PSGC 410 create curved in-plane phase fronts to focus light into narrow waveguides on the chip. Similarly, the PMGC 420 may couple light signals with approximately circular phase fronts in the plane of the chip into a fiber at two different wavelengths.

As in FIGS. 3A and 3B, the wavelengths coupled by the PSGC 410 and PMGC 420 in FIGS. 4A and 4B are indicated by $\lambda_1$ and $\lambda_2$.

Figures 5A, 5B:
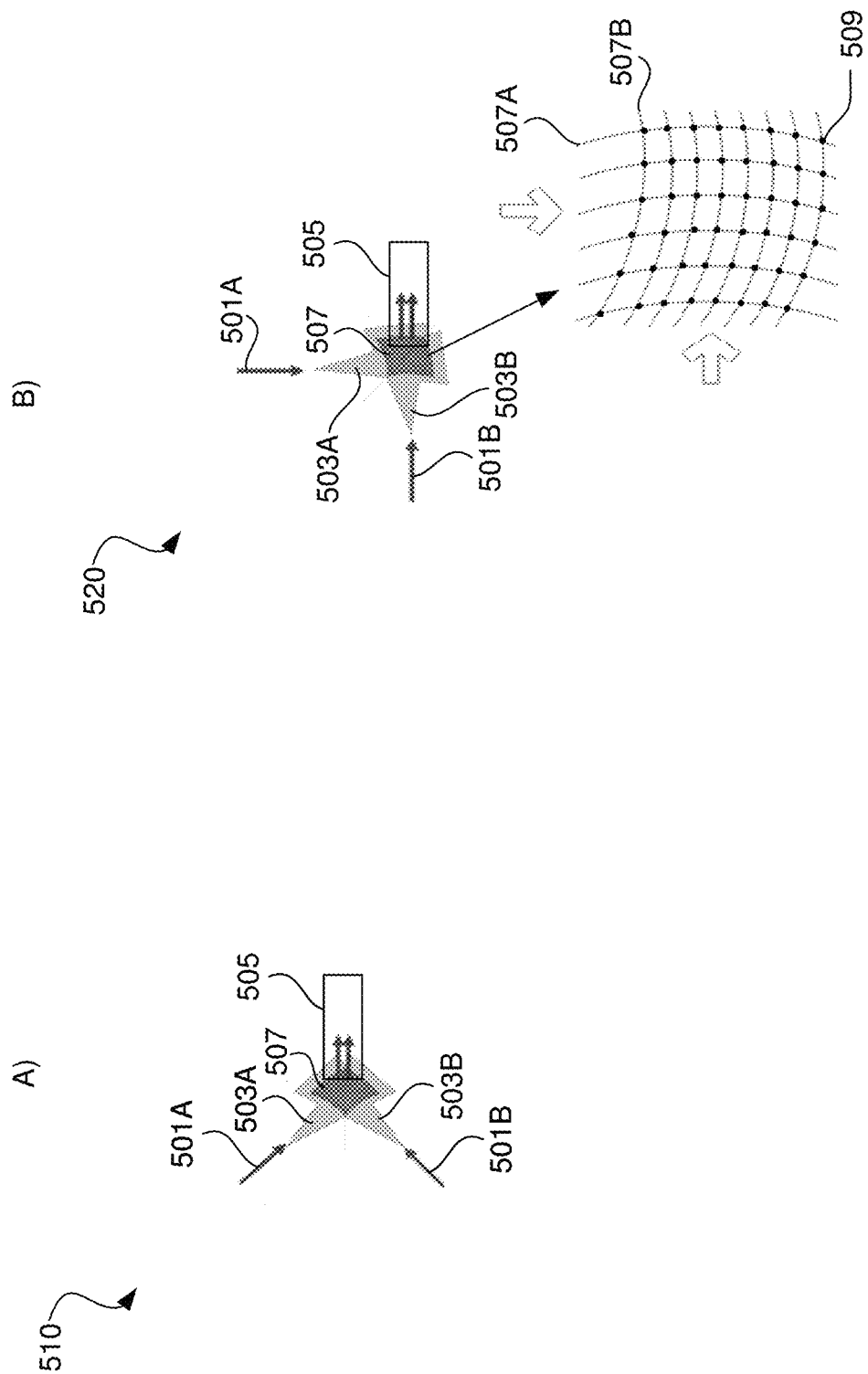
FIGS. 5A and 5B illustrate example fiber orientations with polarization multiplexing grating coupler designs, in accordance with an example embodiment of the disclosure.

FIGS. 5A and 5B illustrate example fiber orientations with polarization multiplexing grating coupler designs, in accordance with an example embodiment of the disclosure. Referring to FIG. 5A, there is shown PMGC 510, waveguides 501A and 501B, and fiber 505. The PMGC 510 comprises grating region 507 and expansion regions 503A and 503B. The grating region 507 may have scatterers at the intersections of the gratings 507A and 507B. In an example scenario, the scatterers 509 may comprise etched circular holes, although other shapes are possible. Similarly, the size of the scatterers 509 shown in FIG. 5B is merely an example, and may be configured based on desired scattering amplitude and wavelength, for example.

Light signals at two wavelengths may be coupled via the narrow waveguides 501A and 501B on the chip to the inputs of the PMGC 510. The submicron size mode expands inside the triangular horn-shaped expansion regions 503A and 503B between the waveguides 501A and 501B and the 2D grating region 507, creating circular phase fronts. The focusing grating of the grating region 507 then scatters both wavelengths into the same fiber 505, out of the plane of the chip. In the example shown in FIG. 5A, the projection of the fiber 505 onto the plane of the chip encloses an approximately 45° angle with both input waveguides 501A and 501B.

FIG. 5B illustrates another type of PMGC where the input waveguides 501A and 501B do not enclose the same angle with the projection of the fiber 505 onto the plane. In this example, the waveguide 501B is approximately parallel to the fiber 505 and the waveguide 501A is approximately perpendicular to it.

The two focusing gratings 507A and 507B comprising the 2D grating 507 can be designed appropriately by taking into account the phase matching condition between the fiber mode and the grating mode in each direction. After computing the proper phase matching, the orientation of the lines making up the 1D grating components is altered, as illustrated in the inset in FIG. 5B. For instance, grating 507B becomes slightly tilted from the horizontal direction to cause the mode incoming from the vertical direction to be scattered into the fiber. Other relative orientations between the fiber 505 and the two waveguides 501A and 501B may be configured.

More than two wavelengths may be multiplexed into a single fiber using such a grating. Each grating direction can couple not just a single wavelength, but a wavelength band into the fiber. For example, there can be four separate signals, carried via four different, but fairly closely spaced, wavelengths in the plane of the PMGC in the direction of the top arrow in the inset of FIG. 5B, and four additional WDM signals in a different wavelength band in the direction of the side arrow. Then the PMGC 520 can multiplex all eight signals into the fiber 505 positioned above it.

Figure 6:
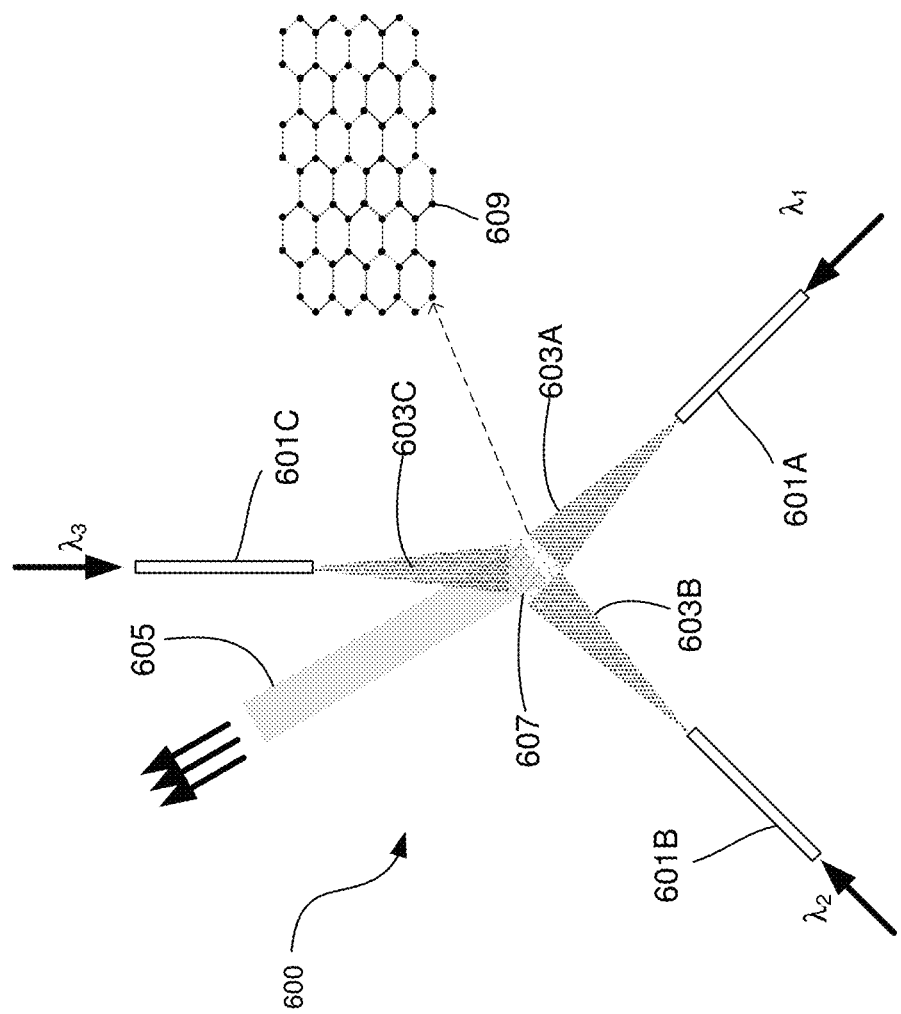
FIG. 6 illustrates a top view of a tri-wavelength multiplexing grating coupler, in accordance with an example embodiment of the disclosure.

FIG. 6 illustrates a top view of a tri-wavelength multiplexing grating coupler, in accordance with an example embodiment of the disclosure. Referring to FIG. 6, there is shown tri-wavelength grating coupler 600, a fiber 605, and waveguides 601A-601C. The grating coupler 600 may comprise expanding regions 603A-603C and scattering region 607 with scatterers 609. While circular scatterers are shown, other shapes and sizes are possible depending on the desired wavelength region or scattering intensity, for example.

In the couplers described in FIGS. 3-5, the 2D grating structure is based on a combination of two one-dimensionally periodic gratings. The two gratings direct light arriving at it from approximately perpendicular directions, therefore the 2D grating is topologically similar to a square lattice, where the scatterers are placed at the intersections of the two 1D gratings. A grating with a triangular/hexagonal symmetry, as shown in the inset of FIG. 6, allows the multiplexing of more than two wavelengths.

The three input waveguides 601A-601C enclose an approximately 120° with each other. The scatterers 609 can be placed at the vertices of the lattice of the scattering region 607. As with FIG. 5B, the scatterers are shown as small circular features, but other shapes and sizes may be used. The periodicity of the grating in the three different directions corresponds to the three wavelengths of the light being coupled to the fiber, according to the phase matching conditions at each wavelength.

The grating coupler 600 may receive optical signals of three different wavelengths $\lambda_1$, $\lambda_2$, and $\lambda_3$, via the waveguides 601A-601C, respectively. The optical signals may be expanded by the expanding regions 603A-603C to increase the modal overlap with the scattering region 607, and therefore increase coupling efficiency into the fiber 605. The fiber 605 is shown at an exaggerated angle from normal to the plane of the grating coupler 600. The grating coupler 600 may also act as a demultiplexer if the optical signal comprising three different wavelengths is incident on the grating.

Figures 7A, 7B, 7C:
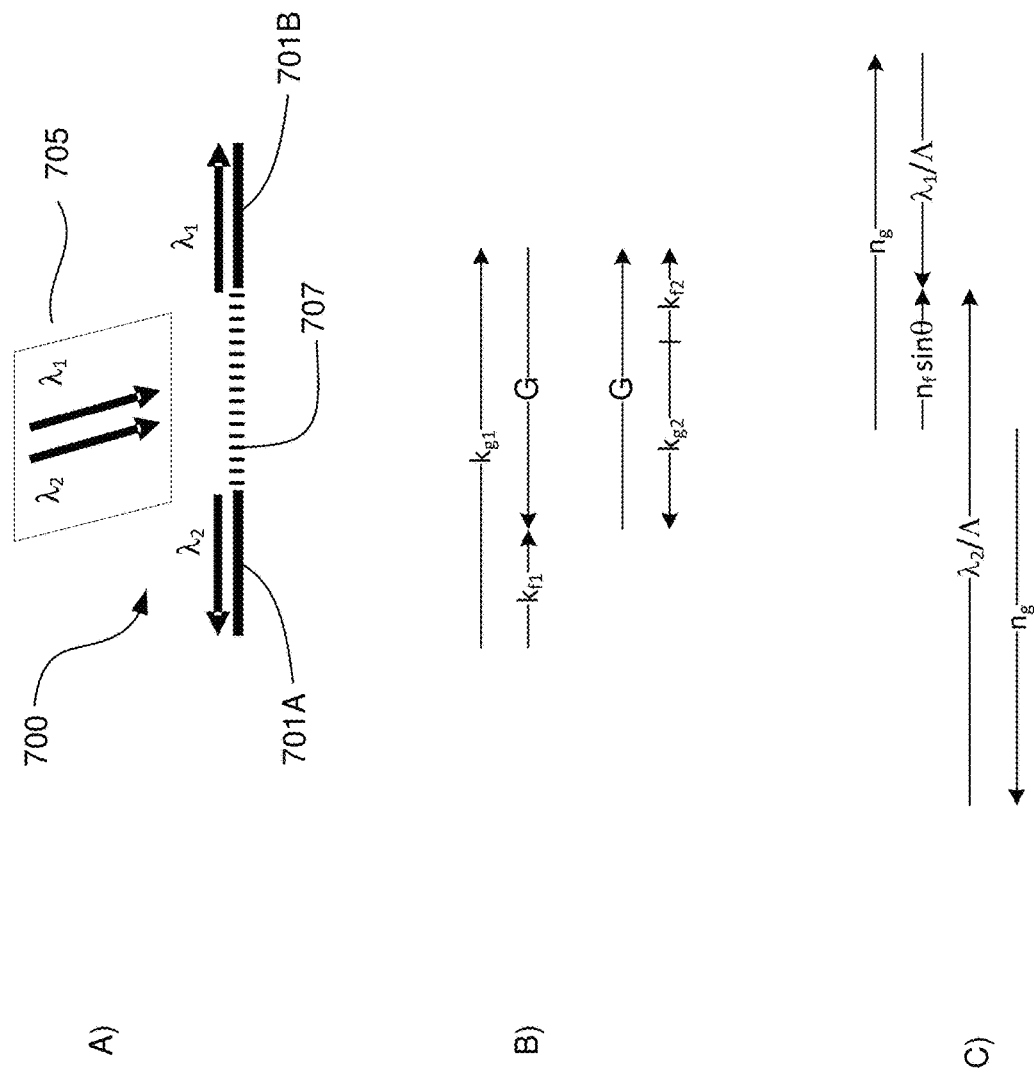
FIGS. 7A-7C illustrate a one-dimensional demultiplexing grating coupler and associated phase matching conditions, in accordance with an example embodiment of the disclosure.

FIGS. 7A-7C illustrate a one-dimensional demultiplexing grating coupler and associated phase matching conditions, in accordance with an example embodiment of the disclosure. Referring to FIG. 7A, there is shown grating coupler 700, waveguides 701A and 701B, and optical fiber 705.

The diffractive grating used in grating couplers can also be used as a demultiplexer by taking advantage of the special property of the grating that different wavelengths can be directed into different scattering orders, therefore spatially separated, by the grating. One example of this is a demultiplexing grating coupler, which comprises a one-dimensionally periodic grating, such as the grating 707 in FIG. 7A. If the fiber 705 above the grating coupler 700 is tilted by a small angle with respect to the normal, along the direction of periodicity, two wavelengths from the fiber can be coupled into the plane of the chip in opposite directions, as illustrated by the arrows labeled $\lambda_1$ and $\lambda_2$.

The optical power at the wavelength indicated by the $\lambda_1$ arrow is coupled in the forward direction, and the optical power at the wavelength indicated by the $\lambda_2$ arrow is coupled in the backward direction. Given the two wavelengths $\lambda_1$ and $\lambda_2$, and effective index of the grating n, and the effective index of the fiber $n_f$, the grating pitch $\Lambda$ and the fiber tilt angle $\theta$ can be calculated from the phase matching conditions.

FIG. 7B illustrates example phase matching requirements for a periodic grating where $\lambda_1 < \lambda_2$. The relevant wavevectors are:

$k_{g1,2}$: wavevector of the mode propagating in the grating at wavelengths $\lambda_{1,2}$ $k_{f1,2}$: projection onto the plane of the chip of the wavevector of the mode propagating in the fiber at wavelengths $\lambda_{1,2}$ G: reciprocal lattice wavevector of the grating The following expressions hold for the magnitudes of these vectors:

$$k_{g1} = \frac{2\pi}{\lambda_1} n_{g1}$$

$$k_{g2} = \frac{2\pi}{\lambda_2} n_{g2}$$

$$k_{f1} = \frac{2\pi}{\lambda_1} n_{f1} \sin\theta$$

$$k_{f2} = \frac{2\pi}{\lambda_2} n_{f2} \sin\theta$$

$$G = \frac{2\pi}{\Lambda}$$

where:

$n_{g1,2}$ is the effective index of the grating mode at wavelengths $\lambda_{1,2}$ $n_{f1,2}$ is the effective index of the fiber mode at wavelengths $\lambda_{1,2}$ For simplicity, in the foregoing it is assumed that the effective indices are independent of wavelength. This assumption, while reasonable, is not always valid, although the wavelength dependence in the effective indices can be easily taken into account as a relatively small correction. In the following, the numerical subscripts are dropped from the effective indices to simplify the calculations.

FIG. 7C illustrates example phase matching conditions for a 1D DMGC in terms of effective indices and shows the same set of vectors, where the wavevectors related to phase matching condition at $\lambda_1$ are rescaled by the free-space wavevector at this wavelength, and the wavevectors related to phase matching condition at $\lambda_2$ are rescaled by the free-space wavevector at the other wavelength. Based on this, the phase matching conditions in terms of the effective indices may be determined:

$$n_g = \frac{\lambda_1}{\Lambda} + n_f \sin\theta$$

$$n_g = \frac{\lambda_2}{\Lambda} - n_f \sin\theta$$

which yield the following equations:

$$\Lambda = \frac{\lambda_1 + \lambda_2}{2 n_g}$$

$$\theta = \sin^{-1} \frac{n_g(\lambda_2 - \lambda_1)}{n_f(\lambda_1 + \lambda_2)}$$

Note that due to the restriction that the fiber be tilted in the same plane as the waveguides in the chip, both the grating pitch and the fiber tilt angle are constrained by the choice of the two wavelengths. The 1D DMGC can also operate as a multiplexer, combining two signals at the two wavelengths from the two different waveguides into a single fiber with optical signals of different wavelengths communicated to the grating 707 with both signals being coupled into the optical fiber 705.

This 1D DMGC may be utilized for demultiplexing if the polarization of the fiber mode is well known, and it is perpendicular to the plane of the drawing. However, in practice, the fiber medium may comprise a single-mode fiber, so the modes at the two wavelengths are typically in unknown polarization states as they exit the fiber. In this circumstance, a 2D version of the DMGC may be utilized.

Figure 8:
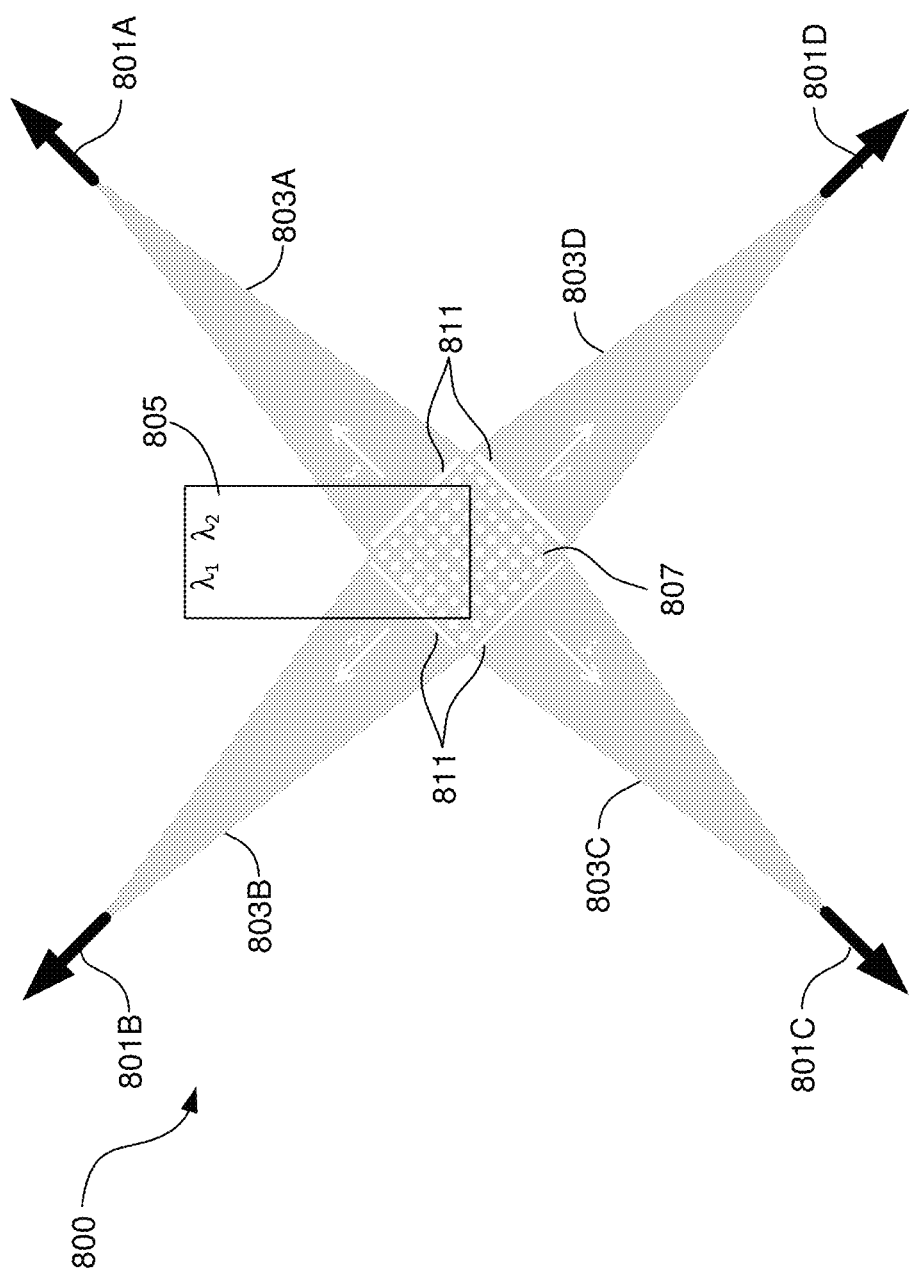
FIG. 8 illustrates a top view of a 2-dimensional demultiplexing grating coupler, in accordance with an example embodiment of the disclosure.

FIG. 8 illustrates a top view of a 2-dimensional demultiplexing grating coupler, in accordance with an example embodiment of the disclosure. Referring to FIG. 8, there is shown grating coupler 800, waveguides 801A-801D, and an optical fiber 805. The grating coupler 800 may comprise expanding regions 803A-803D that expand from the waveguides 801A-801D to a center grating region 807. The area of the grating region 807 may be configured to approximately match the fiber mode. The expanding regions 803A-803D may be tapered from the size of the grating region 807 down to that of the waveguides 801A-801D. In an example scenario, the grey regions may comprised unetched silicon where the white regions comprise partially etched regions of the silicon. The taper may be a linear taper or another shape that is not linear, for instance, a parabolic shape.

The DMGC 800 is based on a 2D grating that comprises two 1D gratings that are approximately perpendicular to each other. The fiber 805 is tilted from the normal to the chip along the direction indicated in the figure. Depending on its polarization state, the optical power in each signal is separated into two substantially perpendicular waveguides. The optical power at the wavelength $\lambda_2$ is coupled in the forward direction, and the optical power at the wavelength $\lambda_1$ is coupled in the reverse direction, analogously to the splitting of the two wavelengths in the 1D DMGC of FIG. 7A.

The coupling efficiency between the mode propagating in the grating 807 and the waveguide mode of the wide side of the tapers 803A-803D may be improved by adding features to the interface between the DMGC grating and each output waveguide taper. A simple embodiment of such a feature would be a narrow slit that is etched in the silicon layer along each edge of the grating, as illustrated by the slits 811 in FIG. 8. Each slit covers approximately the entire edge of the DMGC grating 807. The width of the slit (the short dimension) is usually very small, shorter than a single wavelength. The width may vary slightly along the edge and the long edges of the slit are not necessarily perpendicular to the bisector of the taper. The distance between the grating 807 and the slits 811 may be on the order or smaller than a single wavelength.

Figure 9A:
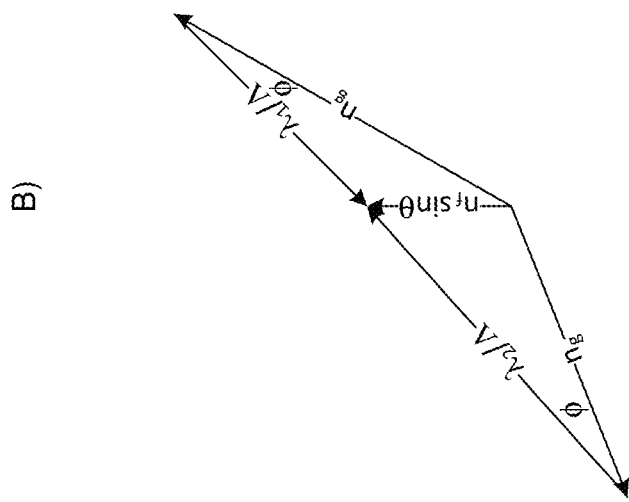
FIGS. 9A and 9B illustrate phase matching conditions for a two-dimensional demultiplexing grating coupler, in accordance with an example embodiment of the disclosure.
Figure 9B:
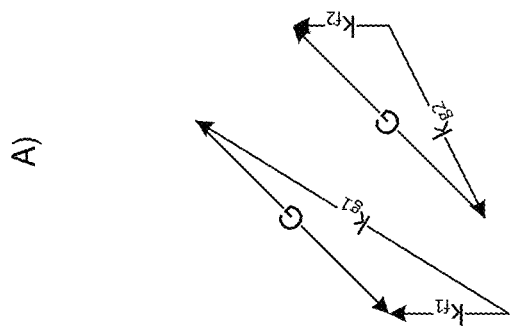

FIGS. 9A and 9B illustrate phase matching conditions for a two-dimensional demultiplexing grating coupler, in accordance with an example embodiment of the disclosure. FIG. 9A shows the phase matching conditions in terms of the wavevectors defined above. The formulae for the pitch and the fiber angle in the case of the 2D DMGC also follow from the phase matching conditions, although they are different from the equation for the 1D DMGC, due to the fact that the angle between the fiber and the output waveguides is approximately 45° in the case of the 2D version. Note that the reciprocal lattice vectors G are not parallel to the wavevectors of the grating modes, as for the 1D grating. There is typically a small angle of a few degrees between the two vectors, which is exaggerated for the purpose of representing the phase matching conditions in this figure.

After rescaling the two groups of vectors as shown above for the 1D DMGC, assuming no wavelength-dependence of the effective indices, the vectors shown in in FIG. 9B are obtained. Compared to the 1D case, there is a new free parameter in the phase matching equations, the small angle $\phi$ enclosed by the grating wavevector and the reciprocal lattice wavevector. Note that this angle is the same for both grating wavevectors, since the triangle shown in FIG. 9B is isosceles. From FIG. 9B, it is also clear that the opposing waveguides for the two different wavelengths are not necessarily parallel.

Figure 10:
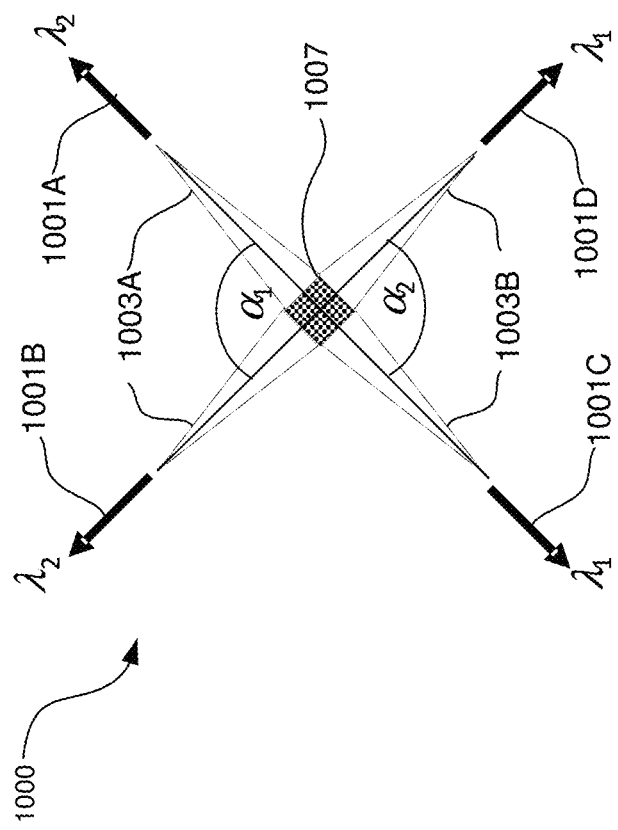
FIG. 10 is a top view of a two-dimensional demultiplexing grating coupler, in accordance with an example embodiment of the disclosure.

FIG. 10 is a top view of a two-dimensional demultiplexing grating coupler, in accordance with an example embodiment of the disclosure. Referring to FIG. 10, there is shown 2D DMGC 1000, waveguides 1001A-1001D, expanding regions 1003A and 1003B, and grating region 1007.

The waveguide pairs, 1001A/1001B and 1001C/1001D, associated with each wavelength enclose an approximately 90° angle. These angles, denoted by $\alpha_1$ and $\alpha_2$, are both preferably close to 90° because of the polarization splitting capability required from the DMGC at the receiver input. The two grating wavevectors define the directions of the waveguides. If the angle $\phi$ between $k_g$ and G is small, then both of these angles can be close to their desired values.

Figure 11:
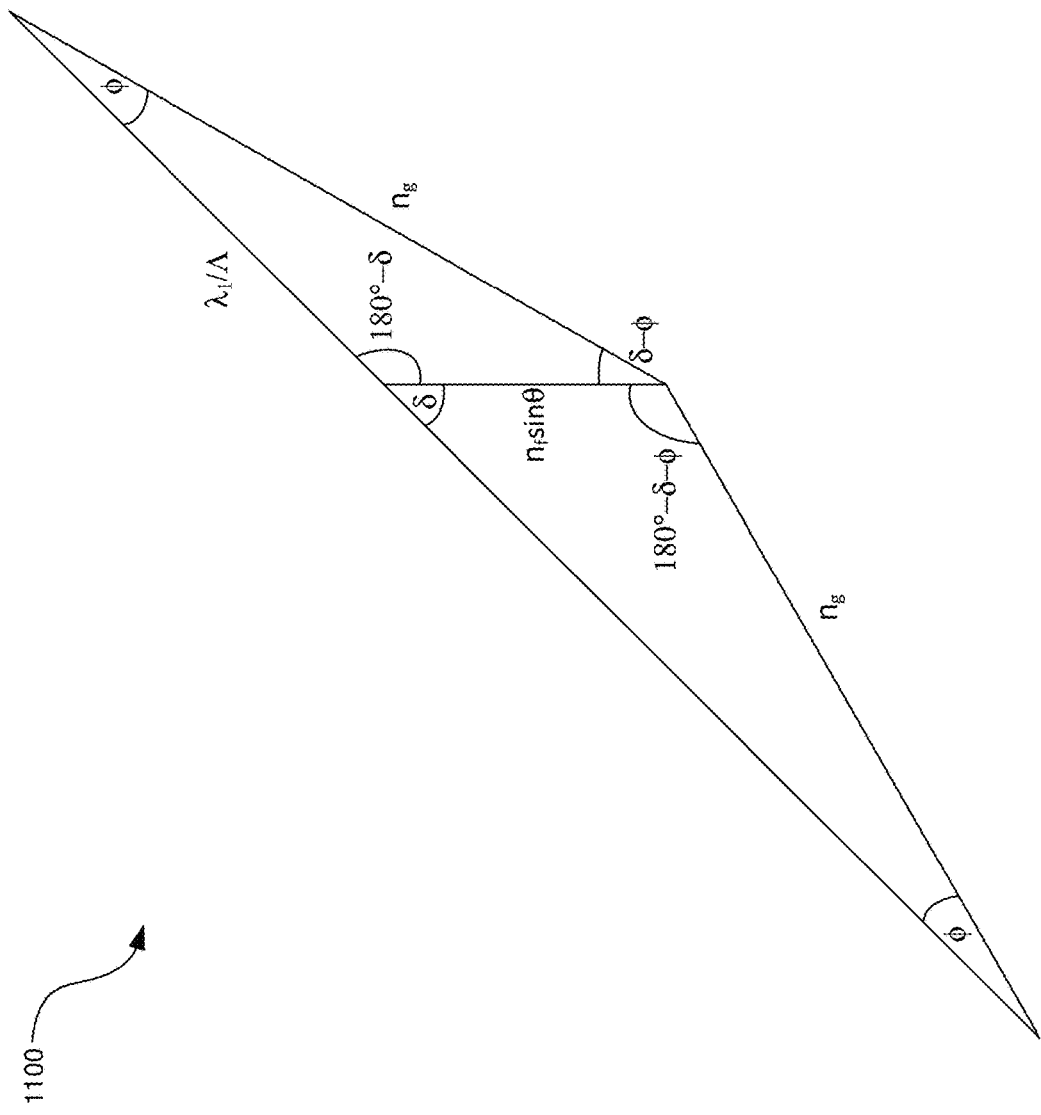
FIG. 11 illustrates angles for phase matching conditions for a two dimensional demultiplexing grating coupler, in accordance with an example embodiment of the disclosure.

FIG. 11 illustrates angles for phase matching conditions for a two dimensional demultiplexing grating coupler, in accordance with an example embodiment of the disclosure. The angles in the drawing illustrate the phase matching condition. Since the grating periodicity is expected to be approximately along the 45° with respect to the fiber tilt plane, for the architecture shown in FIG. 10, the angle $\delta$ should be close to 45°. The angles enclosed by the pairs of waveguides associated with $\lambda_1$ and with $\lambda_2$, are, respectively, $\alpha_1 = 2\delta - 2\phi$ $\alpha_2 = 2\delta + 2\phi$ Therefore if $\delta = 45°$, a configuration is obtained where, for both wavelengths, the magnitude of the deviation from the desired angle of 90° is the same, namely, $2\phi$.

In an example scenario, a configuration where $\delta$ is different from 45° may be advantageous if, for instance, it is preferred to reduce the polarization dependence of the DMGC for one of the wavelengths. For instance, setting $\delta = 45° + \phi$ will result in $\alpha_1 = 90°$ but $\alpha_2 = 90° + 4\phi$.

With these definitions, the cosine and sine rules may be utilized to determine the phase matching conditions:

$$2 n_g \cos \phi = \frac{\lambda_1 + \lambda_2}{\Lambda}$$

$$n_g^2 + \left(\frac{\lambda_1}{\Lambda}\right)^2 - 2 n_g \frac{\lambda_1}{\Lambda} \cos \phi = n_f^2 \sin^2 \theta$$

$$\frac{\sin \phi}{n_f \sin \theta} = \frac{\sin \delta}{n_g}$$

from which the pitch, $\delta$, and $\phi$ may be expressed as a function of the fiber tilt angle:

$$\Lambda = \sqrt{\frac{\lambda_1 \lambda_2}{n_g^2 - n_f^2 \sin^2 \theta}}$$

$$\phi = \cos^{-1}\left(\frac{\lambda_1 + \lambda_2}{2 n_g \Lambda}\right)$$

-continued $$\delta = \cos^{-1}\left(\frac{\lambda_2 - \lambda_1}{2n_f \Lambda \sin\theta}\right)$$

If the wavelength-dependence of the effective indices is taken into account, then there may be small corrections to these formulae.

Figure 12:
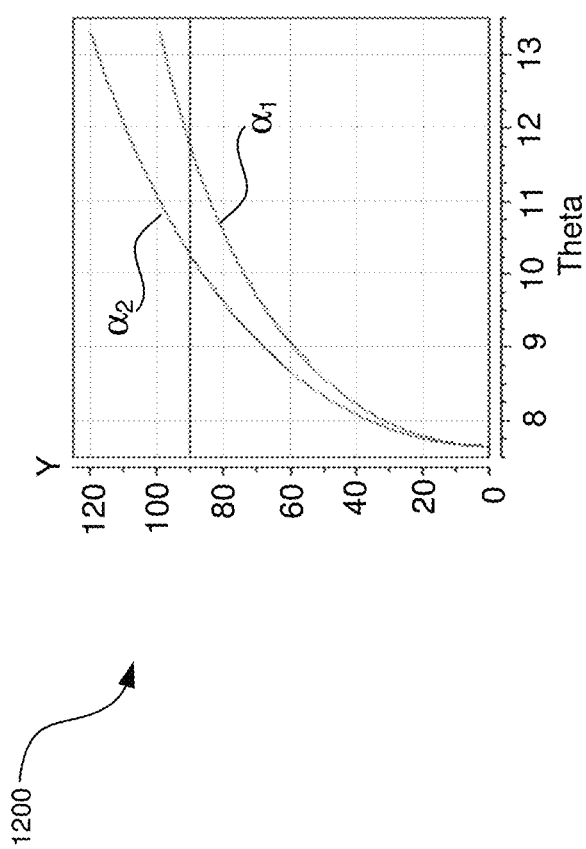
FIG. 12 illustrates angles between output waveguides as a function of fiber tilt angle, in accordance with an example embodiment of the disclosure.

FIG. 12 illustrates angles between output waveguides as a function of fiber tilt angle, in accordance with an example embodiment of the disclosure. As an example, it may be assumed that $n_g=3$, $n_f=1.45$, $\lambda_1=1310$ nm and $\lambda_2=1490$ nm. The resulting values for $\alpha_1$ and $\alpha_2$ are plotted in FIG. 12. The plot indicates that the fiber tilt angle is in the range of approximately 10.5°-11° in order to achieve angles between the output waveguides that are close to 90°. This range is only an example and may be different, depending on the actual application.

In its simplest embodiment, the 2D DMGC contains a uniform straight grating. However, the grating can be apodized to improve the mode matching between the Gaussian fiber mode and the scattered mode. In addition, the grating may be designed using curved grating, like in a PMGC, which can reduce the taper length needed to convert the mode size horizontally from the size of the fiber to the size of the integrated waveguide, which is typically submicron.

Figures 13A, 13B:
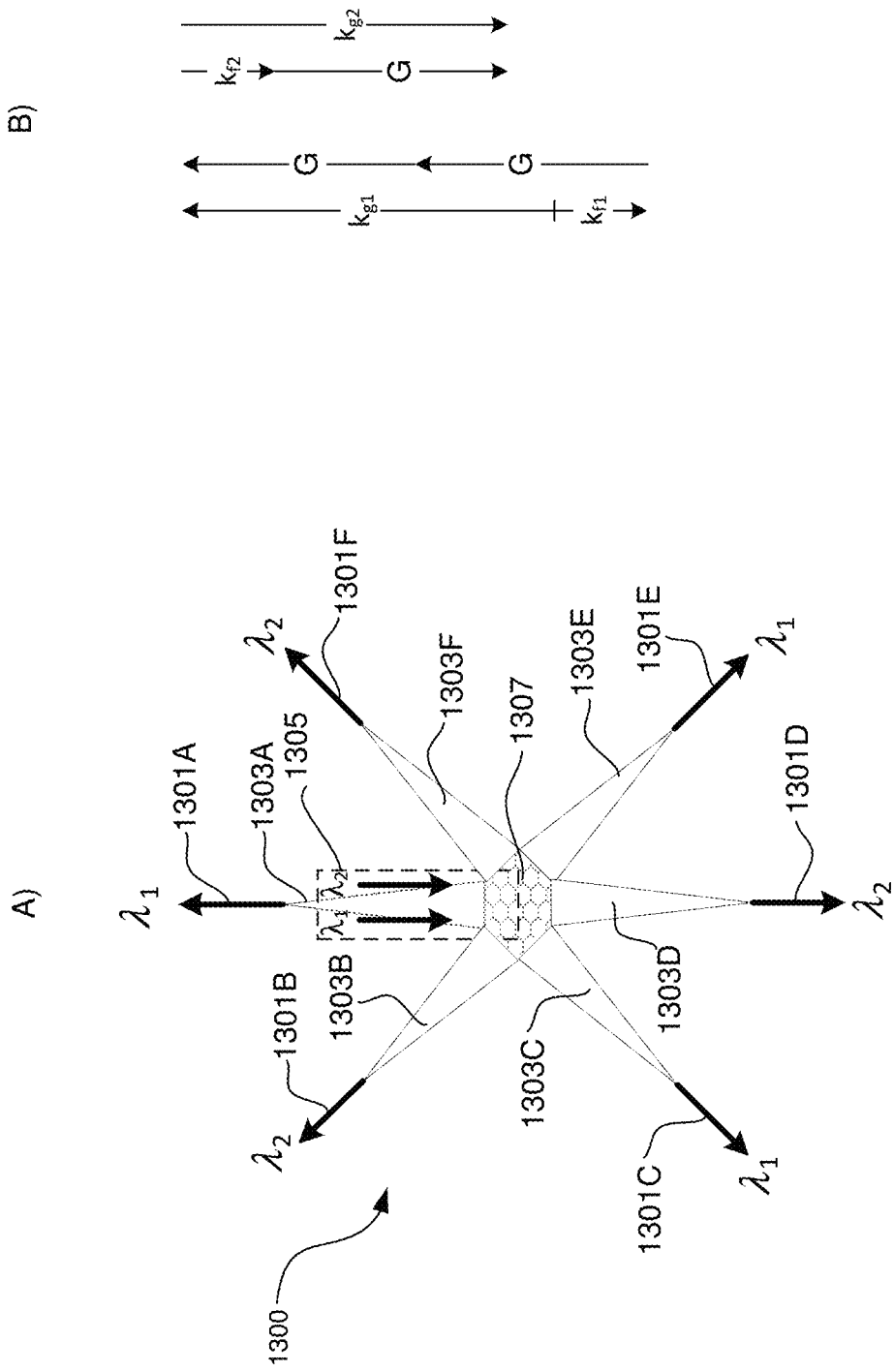
FIGS. 13A and 13B illustrate a six-waveguide two dimensional demultiplexing grating coupler and associated phase matching conditions, in accordance with an example embodiment of the disclosure.

FIGS. 13A and 13B illustrate a six-waveguide two dimensional demultiplexing grating coupler and associated phase matching conditions, in accordance with an example embodiment of the disclosure. Referring to FIG. 13A, there is shown grating coupler 1300, waveguides 1301A-1301F, and optical fiber 1305. The grating coupler 1307 may comprise expanding regions 1303A-1303F and a grating region 1307.

In an example scenario, the grating is defined by a hexagonal lattice, as in the case of the tri-wavelength multiplexing grating coupler in FIG. 6. However, in this design, the pitches defining the grating region 1307 are chosen in such a way that phase matching occurs for $\lambda_1$ in three of the six waveguide directions, and phase matching occurs for $\lambda_2$ in the other three directions.

Four of the waveguides, 1301B, 1301C, 1301E, and 1301F, are not aligned with the plane of the fiber 1305. The phase matching condition for these directions can be calculated similarly to what was done for the DMGC with four waveguides. Due to the presence of the other two waveguides, 1301A and 1301D, it is no longer necessary to set $\alpha_1$ and $\alpha_2$ to be close to 90°. In fact, the design may be chosen such that these two angles are both close to, for example, 60°. In the example design for the four-waveguide DMGC above, with reference to FIG. 12, the fiber tilt angle may be configured to be approximately 8.8°.

The periodicity of the grating in the direction along the fiber 1305 is also determined by the phase matching conditions. In contrast with the design for the other four waveguides, in this direction the shorter wavelength $\lambda_1$ is scattered in the backward direction with respect to the fiber, which is opposite to the 1D DMGC configuration.

One way to achieve this is to follow the example phase matching configuration shown in FIG. 13B. In contrast with the phase matching for the 1D DMGC, the scattering for $\lambda_1$ is now second-order. This condition implies the equations $$n_g = \frac{2\lambda_1}{\Lambda} - n_f \sin\theta$$

-continued $$n_g = \frac{\lambda_2}{\Lambda} + n_f \sin\theta$$

which yield the following:

$$\Lambda = \frac{2\lambda_1 + \lambda_2}{2n_g}$$

$$\theta = \sin^{-1}\frac{n_g(2\lambda_1 - \lambda_2)}{n_f(2\lambda_1 + \lambda_2)}$$

This fiber tilt angle in turn determines the angle $\delta$, which allows the rest of the DMGC 1300 to be designed.

Figure 14:
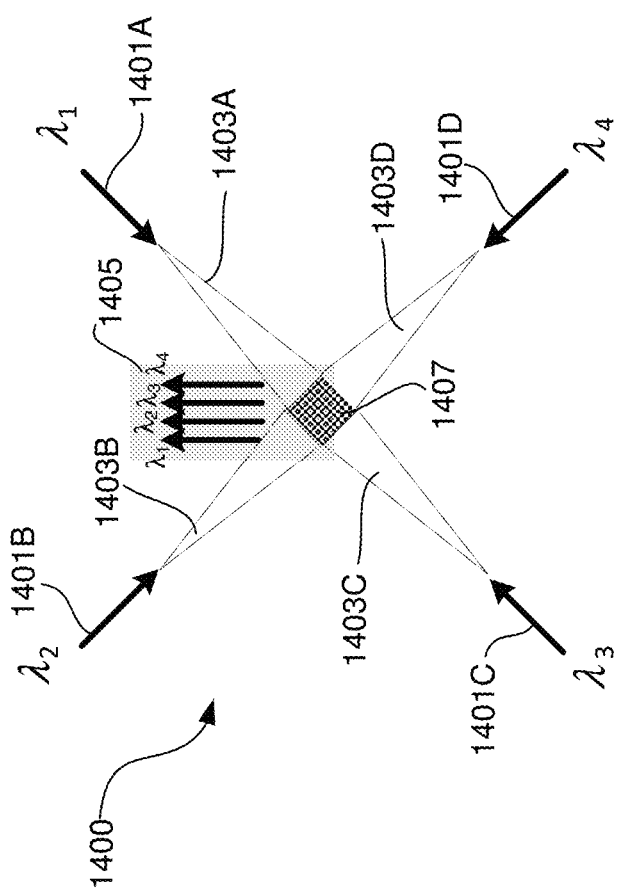
FIG. 14 illustrates a top view of a quad multiplexing grating coupler, in accordance with an example embodiment of the disclosure.

FIG. 14 illustrates a top view of a quad multiplexing grating coupler, in accordance with an example embodiment of the disclosure. Referring to FIG. 14, there is shown grating coupler 1400, waveguides 1401A-1401D, and optical fiber 1405. The grating coupler 1400 may comprise a quad multiplexing grating coupler (QMGC) and may include expanding regions 1403A-1403D and grating region 1407.

The 2D DMGC concept can also be used to create a coupler that multiplexes four different wavelengths together into a single fiber. The two 1D gratings that make up the 2D grating do not have to be identical but can be designed for different pairs of wavelengths. If the PMGC is the multiplexing analogue of the PSGC, then the QMGC is the multiplexing analogue of the DMGC.

The grating coupler 1400 may receive optical signals of four different wavelengths from the four input waveguides 1401A-1401D where the grating region 1407 couples the optical signals into the fiber 1405, thereby multiplexing four wavelengths into a single fiber.

Figure 15:
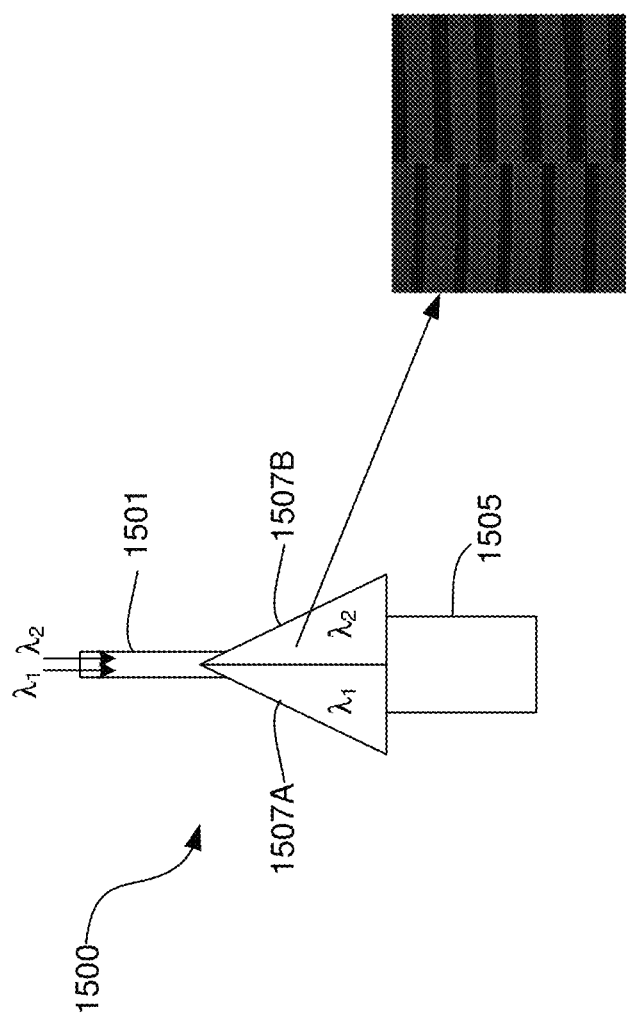
FIG. 15 illustrates a beam-splitting single polarization grating coupler, in accordance with an example embodiment of the disclosure.

FIG. 15 illustrates a beam-splitting single polarization grating coupler, in accordance with an example embodiment of the disclosure. Referring to FIG. 15, there is shown grating coupler 1500, input optical waveguide 1501, and optical fiber 1505. The grating coupler 1500 may comprise a beam-splitting single polarization grating coupler (BSGC) with grating sections 1507A and 1507B.

The BSGC may be similar to a standard SPGC where the two halves 1507A and 1507B of the grating coupler 1500 are designed for different wavelengths. If both wavelengths travel in a single waveguide 1501, for instance, after having been combined in a waveguide multiplexer, they can be both coupled into a single fiber 1505 using this BSGC configuration on a transmitter, for instance. The grating in the two portions 1507A and 1507B have different grating pitch, as shown in the inset of FIG. 15.

The inset in FIG. 15 shows the central portion of the grating of an exemplary BSGC layout implemented in silicon-SiO$_2$ platform. In this figure, the lighter shaded area represents the unetched portion of the silicon thin film, whereas the darker shaded area represents the etched portion. The refractive index contrast between the etched and unetched portions creates the diffractive grating. The right and left halves of the inset show the gratings design for the two different wavelengths.

Figures 16A, 16B:
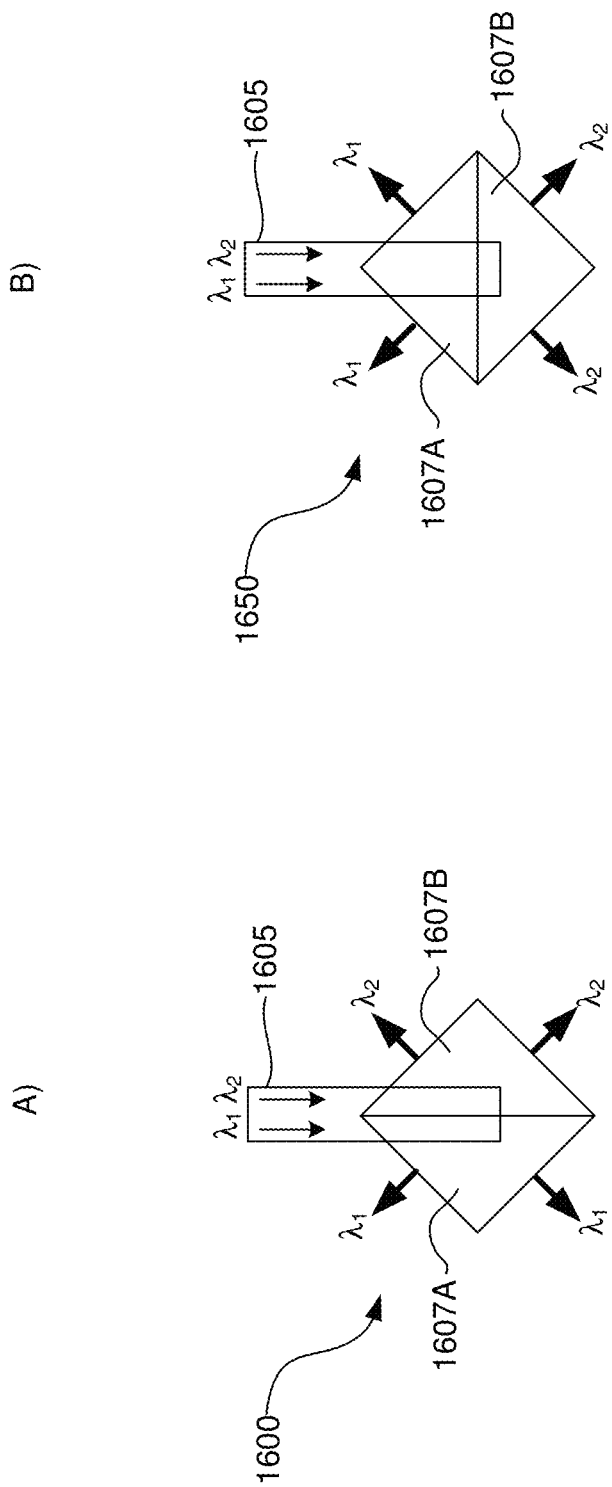
FIGS. 16A and 16B illustrate different versions of beam-splitting single polarization grating couplers, in accordance with an example embodiment of the disclosure.

FIGS. 16A and 16B illustrate different versions of beam-splitting single polarization grating couplers, in accordance with an example embodiment of the disclosure. Referring to FIG. 16A, there is shown an input fiber 1605 and grating coupler 1600, which may comprise a BSGC with grating sections 1607A and 1607B.

On the receiver side of an optoelectronic transceiver, as the polarization state of the fiber mode is often unknown, a polarization-independent version of the BSGC can be used. It is similar to a polarization splitting grating coupler (PSGC) in which the two halves of the grating are designed for different wavelengths, as shown by the grating sections 1607A and 1607B, where each is designed as a grating for a PSGC. The fiber 1605 is near-perpendicular to the plane of the chip and is situated with its endface near the center of the grating.

FIG. 16B illustrates input fiber 1605 and grating coupler 1650, which may comprise a BSGC with grating sections 1607A and 1607B oriented in a direction perpendicular to the BSGC of FIG. 16A.

To ensure that the optical power in each wavelength is scattered into a different direction in the plane of the chip, the grating sections 1607A and 1607B for the two wavelengths are designed appropriately. For instance, referring to the example on the FIG. 16B, the grating section 1607B scatters the corresponding wavelength in the forward direction, whereas the 1607A scatters the corresponding wavelength in the backward direction.

Similarly, for the lateral structure of the grating coupler 1600 in FIG. 16A, grating section 1607A scatters $\lambda_1$ optical signals to the left and grating section 1607B scatters $\lambda_2$ optical signals to the right.

To achieve this mode of operation, the individual portions of the grating are designed as illustrated in FIGS. 17A-17C and FIGS. 18A-18C.

Figures 17A, 17B, 17C:
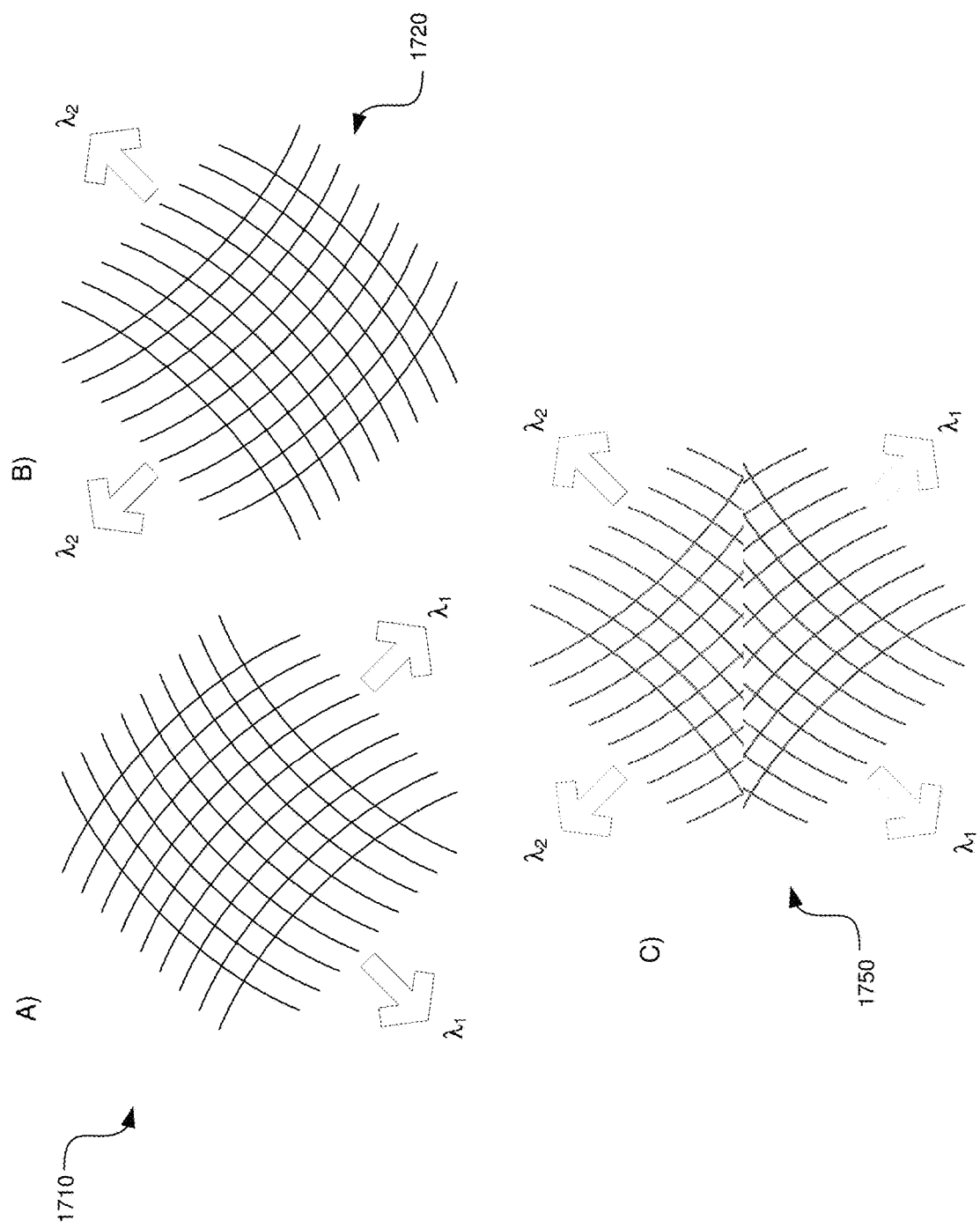
FIGS. 17A-17C illustrate grating designs for vertical orientation beam-splitting single polarization grating couplers, in accordance with an example embodiment of the disclosure.

FIGS. 17A-17C illustrate grating designs for vertical orientation beam-splitting single polarization grating couplers, in accordance with an example embodiment of the disclosure. Referring to FIG. 17A, there is shown a first grating 1710 for coupling optical signals with a wavelength $\lambda_1$ in the forward direction, assuming a fiber orientation as shown in FIGS. 16A and 16B. Similarly, FIG. 17B shows a second grating 1720 for coupling optical signals with a wavelength $\lambda_2$ in the backward direction.

FIG. 17C illustrates a combination of the two gratings of FIGS. 17A and 17C, where optical signals with $\lambda_2$ wavelength are coupled in the backward direction and optical signals with $\lambda_1$ wavelength are coupled in the forward direction.

In the example given above in FIGS. 17A-17C, the symmetry of the grating is retained. However, referring to the example of FIG. 16A, this no longer holds. In this case, the grating portions are designed differently from a standard focusing PSGC, because the two waveguides into which each wavelength is split do not enclose the same angle with the fiber. Instead, the angles enclosed by the projection of the fiber onto the chip and the aforementioned two waveguides are, in this example, are approximately 45° and 135°, respectively.

Figures 18A, 18B, 18C:
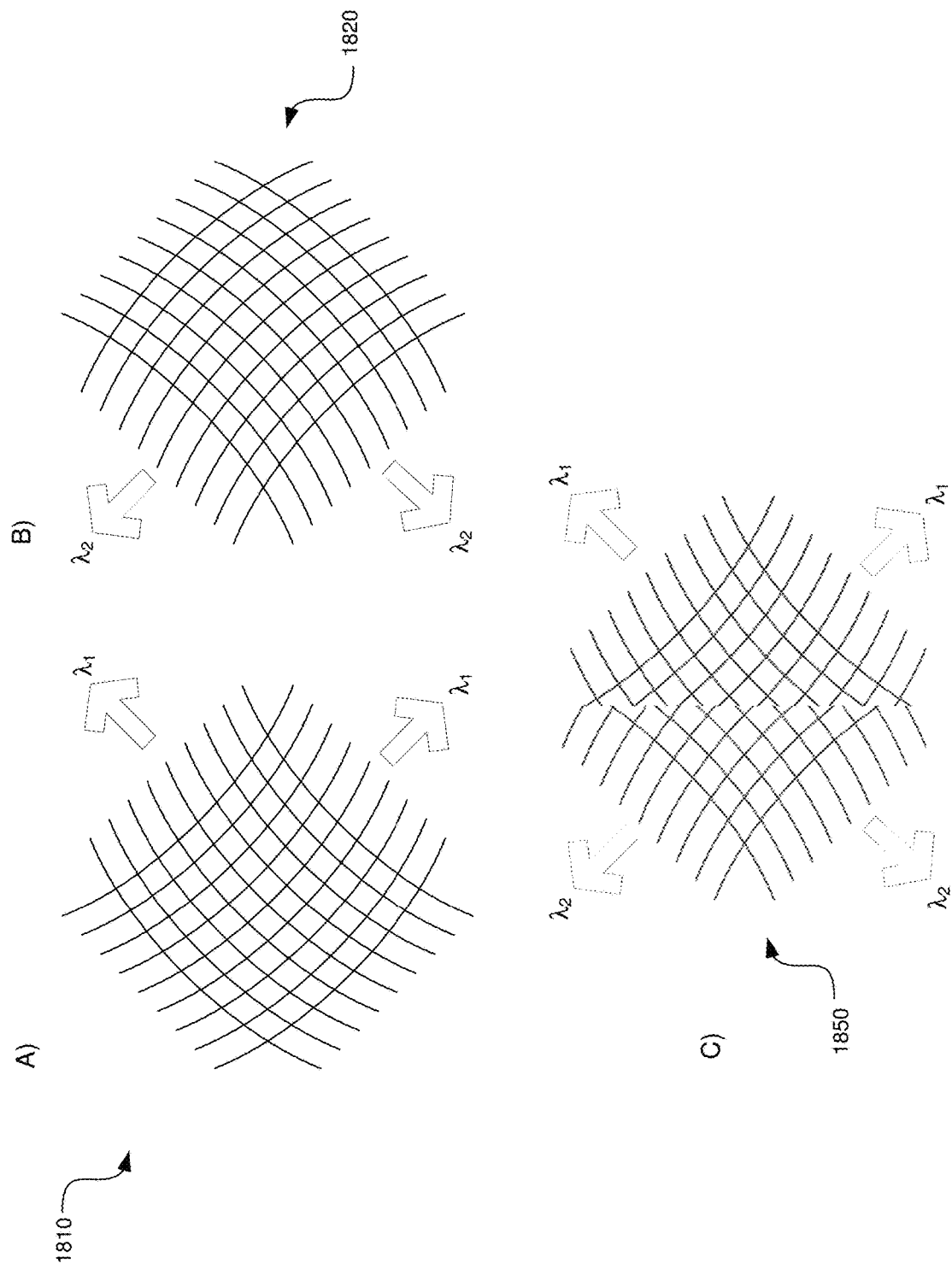
FIGS. 18A-18C illustrate grating designs for horizontal orientation beam-splitting single polarization grating couplers, in accordance with an example embodiment of the disclosure.

FIGS. 18A-18C illustrate grating designs for horizontal orientation beam-splitting single polarization grating couplers, in accordance with an example embodiment of the disclosure. Referring to FIG. 18A, there is shown a first grating 1810 for coupling optical signals with a wavelength $\lambda_1$ to the right, assuming a fiber orientation as shown in FIGS. 16A and 16B. Similarly, FIG. 18B shows a second grating 1820 for coupling optical signals with a wavelength $\lambda_2$ to the left.

The schematic views of the underlying gratings for this type of polarization-independent BSGC are shown in FIGS. 18A and 18B and the resulting merged grating is shown in FIG. 18C. Note that the BSGC approach described with respect to FIGS. 17A-17C and 18A-18C can also be used to split or combine more than two wavelengths.

In an example embodiment, a method and system are disclosed for silicon photonics wavelength division multiplexing transceivers. In this regard, aspects of the disclosure may comprise in a transceiver integrated in a silicon photonics chip, where the transceiver is operable to: generate a first modulated output optical signal at a first wavelength utilizing a first electrical signal, generate a second modulated output optical signal at a second wavelength utilizing a second electrical signal, and communicate the first and second modulated output optical signals into an optical fiber coupled to the chip utilizing a multiplexing grating coupler in the chip.

A received input optical signal may be split into a modulated input optical signal at the first wavelength and a modulated input optical signal at the second wavelength utilizing a demultiplexing grating coupler in the chip. The modulated input optical signal at the first wavelength may be converted to a first electrical input signal utilizing a first photodetector in the chip. The modulated input optical signal at the second wavelength may be converted to a second electrical input signal utilizing a second photodetector in the chip. The first and second modulated output optical signals may be generated by modulating continuous wave (CW) optical signals at the first and second wavelengths, respectively.

The multiplexing grating coupler and/or the demultiplexing grating coupler may comprise a grating region and an expanding region between the grating region and an optical waveguide, with a slit between the grating region and the tapered region. The multiplexing grating coupler may comprise a pair of intersecting gratings. A spacing of each intersecting grating may be configured to scatter optical signals at one of the first and second wavelengths. Scatterers may be situated at intersections of the intersecting gratings. The scatterers may comprise holes in a silicon layer at or near a top surface of the silicon photonics chip.

The multiplexing grating coupler and/or the demultiplexing grating coupler may comprise a grating with hexagonal symmetry. The demultiplexing grating coupler may comprise a grating that scatters optical signals at the first wavelength into at least one waveguide in the silicon photonics chip in a first direction and scatters optical signals at the second wavelength into at least one waveguide in the silicon photonics chip in a second direction substantially opposite to the first direction. The multiplexing grating coupler and/or the demultiplexing grating coupler may comprise a beam-splitting grating coupler.

In another example embodiment, a system is disclosed for silicon photonics wavelength division multiplexing transceivers. In this regard, aspects of the disclosure may comprise a transceiver integrated in a silicon photonics chip, the transceiver being operable to: generate a plurality of modulated output optical signals at different wavelengths utilizing a plurality of electrical signals and communicate the plurality of modulated output optical signals into an optical fiber coupled to the chip utilizing a multiplexing grating coupler in the chip. The multiplexing grating coupler may comprise an array of scatterers with spacing between the scatterers in different directions corresponding to the different wavelengths, and expanding regions between the array of scatterers and waveguides coupled to the multiplexing grating coupler.

In another example embodiment, a system is disclosed for silicon photonics wavelength division multiplexing transceivers. In this regard, aspects of the disclosure may comprise a transceiver integrated in a silicon photonics chip, the transceiver being operable to: receive an input optical signal that comprises a plurality of optical signals at different wavelengths from an optical fiber coupled to the chip utilizing a demultiplexing grating coupler in the chip. The demultiplexing grating coupler may comprise an array of scatterers with spacing between the scatterers in different directions corresponding to the different wavelengths and expanding regions between the array of scatterers and waveguides coupled to the demultiplexing grating coupler.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for optical communication, the method comprising:
    in a transceiver integrated in a silicon photonics chip:
        communicating first and second modulated optical signals into an optical fiber coupled to the chip utilizing a multiplexing grating coupler in the chip, wherein the multiplexing grating coupler comprises:
            a pair of intersecting gratings with scatterers situated at intersections of the intersecting gratings;
            an expanding region between the pair of intersecting gratings and an optical waveguide; and
            a slit comprising a reduced thickness of silicon between the pair of intersecting gratings and the expanding region; and
        splitting a received input optical signal into a modulated input optical signal at a first wavelength and a modulated input optical signal at a second wavelength utilizing a demultiplexing grating coupler in the chip.

2. The method according to claim 1, comprising generating the first and second modulated output optical signals by modulating continuous wave (CW) optical signals at the first and second wavelengths, respectively.

3. The method according to claim 1, wherein the slit between the expanding region and the pair of intersecting gratings is separated from the pair of intersecting gratings by a distance of approximately a single wavelength of the first or second modulated output optical signals.

4. The method according to claim 1, wherein a spacing of each intersecting grating is configured to scatter optical signals at one of the first and second wavelengths.

5. The method according to claim 1, wherein the scatterers comprise holes in a silicon layer at or near a top surface of the silicon photonics chip.

6. The method according to claim 1, wherein the multiplexing grating coupler and/or the demultiplexing grating coupler comprises a grating with hexagonal symmetry.

7. The method according to claim 1, wherein the demultiplexing grating coupler comprises a grating that scatters optical signals at the first wavelength into at least one waveguide in the silicon photonics chip in a first direction and scatters optical signals at the second wavelength into at least one waveguide in the silicon photonics chip in a second direction substantially opposite to the first direction.

8. The method according to claim 1, wherein the multiplexing grating coupler and/or the demultiplexing grating coupler comprises a beam-splitting grating coupler.

9. A system for communication, the system comprising:
    a transceiver integrated in a silicon photonics chip, the transceiver being operable to:
        communicate first and second modulated output optical signals into an optical fiber coupled to the chip utilizing a multiplexing grating coupler in the chip, wherein the multiplexing grating coupler comprises:
            a pair of intersecting gratings with scatterers situated at intersections of the intersecting gratings;
            an expanding region between the pair of intersecting gratings and an optical waveguide; and
            a slit comprising a reduced thickness of silicon between the pair of intersecting gratings and the expanding region; and
        split a received input optical signal into a first modulated input optical signal at a first wavelength and a second modulated input optical signal at a second wavelength utilizing a demultiplexing grating coupler in the chip.

10. The system according to claim 9, wherein the transceiver is operable to generate the first and second modulated output optical signals by modulating continuous wave (CW) optical signals at the first and second wavelengths, respectively.

11. The system according to claim 9, wherein a spacing of each intersecting grating is configured to scatter optical signals at one of the first and second wavelengths.

12. The system according to claim 9, wherein the scatterers comprise holes in a silicon layer at or near a top surface of the silicon photonics chip.

13. The system according to claim 9, wherein the multiplexing grating coupler and/or the demultiplexing grating coupler comprises a grating with hexagonal symmetry.

14. The system according to claim 9, wherein the demultiplexing grating coupler comprises a grating that scatters optical signals at the first wavelength into a waveguide in the silicon photonics chip in a first direction and scatters optical signals at the second wavelength into a waveguide in the silicon photonics chip in a second direction substantially opposite to the first direction.

15. The system according to claim 9, wherein the multiplexing grating coupler and/or the demultiplexing grating coupler comprises a beam-splitting grating coupler.

16. The system according to claim 9, wherein the slit between the expanding region and the pair of intersecting gratings is separated from the pair of intersecting gratings by a distance of approximately a single wavelength of the first or second modulated output optical signals.

* * * * *

UNITED STATES PATENT AND TRADEMARK OFFICE
CERTIFICATE OF CORRECTION

PATENT NO. : 10,686,526 B2
APPLICATION NO. : 16/353582
DATED : June 16, 2020
INVENTOR(S) : Attila Mekis et al.

It is certified that error appears in the above-identified patent and that said Letters Patent is hereby corrected as shown below:

In the Specification

In Column 14, Line 19, delete "ai" and insert -- $\alpha_1$ --, therefor.

Signed and Sealed this
Fourth Day of August, 2020

Andrei Iancu
*Director of the United States Patent and Trademark Office*